July 27, 1965

R. J. URQUHART 3,197,621

REAL TIME CONTROL SYSTEM FOR PROCESSING
MAIN AND INCREMENTAL QUANTITIES

Filed Dec. 30, 1960

INVENTOR
ROBERT J. URQUHART

BY Paul D. Carmichael
ATTORNEY

July 27, 1965 R. J. URQUHART 3,197,621
REAL TIME CONTROL SYSTEM FOR PROCESSING
MAIN AND INCREMENTAL QUANTITIES
Filed Dec. 30, 1960 9 Sheets-Sheet 2

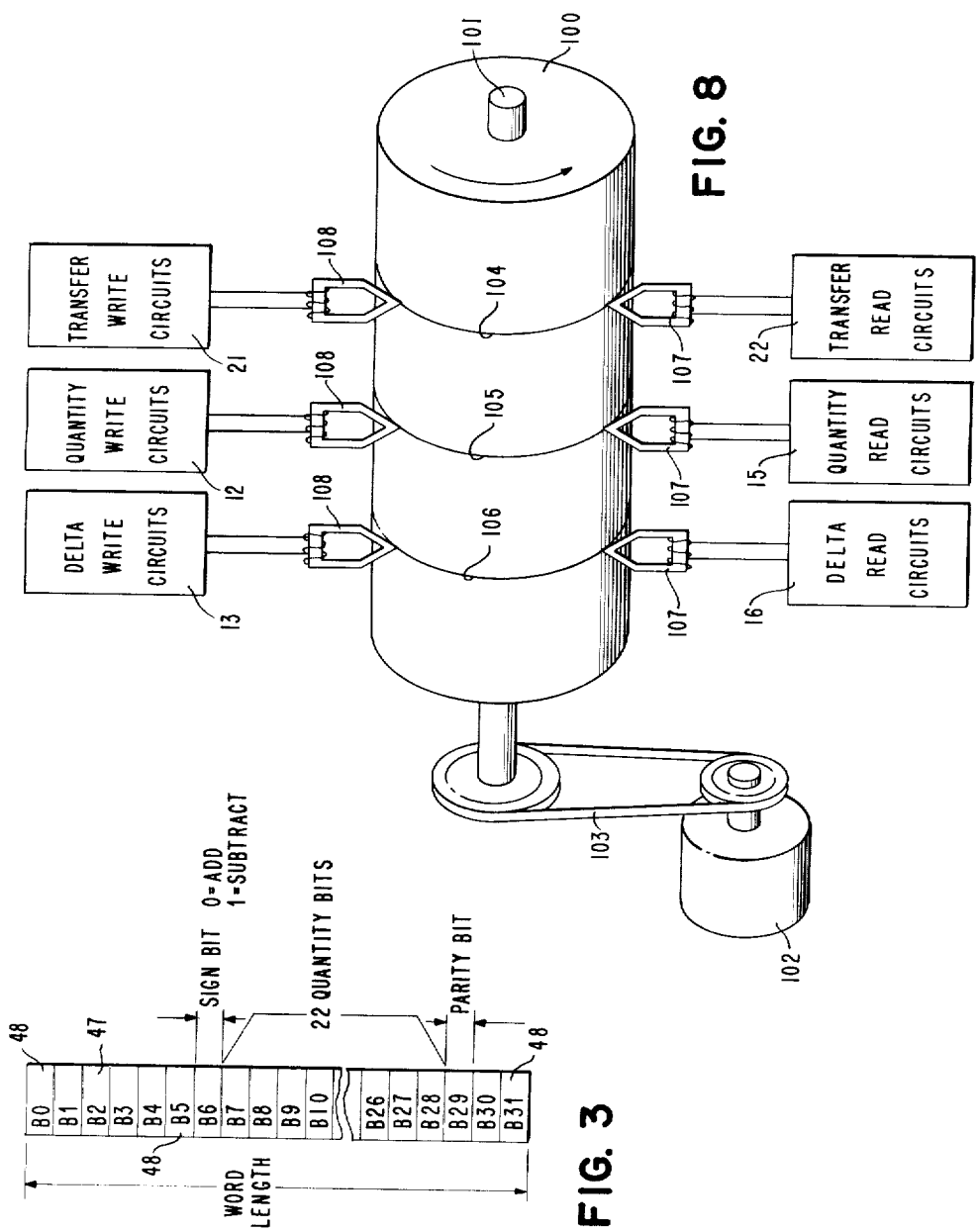

United States Patent Office 3,197,621
Patented July 27, 1965

3,197,621
REAL TIME CONTROL SYSTEM FOR PROCESSING
MAIN AND INCREMENTAL QUANTITIES
Robert J. Urquhart, Endicott, N.Y., assignor to International Business Machines Corporation, New York, N.Y., a corporation of New York
Filed Dec. 30, 1960, Ser. No. 79,869
17 Claims. (Cl. 235—152)

The present invention relates generally to method and apparatus for processing data and more particularly to the computer arts.

Digital computers are widely employed for processing data or information. In many instances the information coming from the computer is used in a real-time environment as, for example, timing the occurrence of some happening or controlling an output device. Also, it is often necessary to supply new data to the computer or to update the information in the computer by supplying data thereto concerning the present condition of the real-time environment. In both of the above situations it is necessary to "bridge the gap" between the computer and its real-time environment. Various conversion means have been proposed in the art as answers to individual and specific translating problems. Examples of such special purpose devices are digital-to-analog and analog-to-digital converters, binary counters which are counted up or down to provide a timed pulse rate or a discrete timed control pulse, buffer storage means and decoder serializers.

Computers are well-known for their ability to process information or data at an extremely fast rate. However, because of space and cost considerations, a computer is usually programmed to process data concerning many simultaneously or sequentially occurring events or functions on a time shared basis. The time interval between successive computations for any particular event or function may be relatively large. The information supplied from the computer for a certain desired function might be inaccurate to the extent it is unacceptable for a significant portion of the time interval between this and the succeeding information supplied by the computer for this function. For example, the response of a motor driven by successive outputs of the computer might be too erratic to properly effect the necessary control function. A timing pulse or pulse rate may be needed which requires a resolution much finer than the time interval between successive computations of this information. Also, it is necessary to introduce information into the computer which occurs at times other than when the computer is able to assimilate this data.

All of the above have somewhat limited the use of computers in connection with real-time environments. When computers have been used in real-time environments, the same have had to be much larger and faster than is actually necessary to obtain the desired resolution in translating the outputs of the computer to the real-time environment and the present condition of the real-time environment to the computer.

Briefly, the present invention relates to a control system for receiving data from a computer or the like, processing such data and supplying to an output device control signals for actuating this device. The control system is also adapted to receive and process data from input devices and to transfer such data to the computer. In particular, the computer places an output for a desired function in a suitable storage means, such as a portion of one track of a magnetic drum. An incremental quantity representing the expected or desired change with respect to a predetermined time interval in the value of the output placed in the first mentioned storage means is computed by the computer and placed in second storage means. The second storage means may comprise a second track of the magnetic drum and the quantity written thereon may represent the expected or desired incremental change in the output during each revolution of the magnetic drum. Periodically the output in the first storage means and the incremental quantity in the second storage means are added or subtracted. The resultant quantity is placed in the first storage means in place of the output initially stored therein. In this manner the output of the computer is effectively and periodically up-dated to provide an accurate representation of an output quantity at all times which may be used for actuating an output device. The information in the computer can be up-dated at times acceptable to the computer by placing the quantity zero in the second storage means and adding to the output of the first storage means information provided by various input means corresponding to the condition of the real-time environment or other quantities. The resultant quantity is then transferred to the accumulator of the computer. The computer can place information into either the first or second storage means.

A third storage means is employed in the circulation of the information as above described. This third storage means is a third track on the magnetic drum. Each revolution of the magnetic drum the output on the first track and the incremental quantity on the second track are read out serially and passed through suitable logic circuit means for providing the algebraic sum thereof. The logic circuit means may take the form of a binary full adder-subtractor. The resultant quantity is then recorded on the third track of the magnetic drum. At an appropriate time the resultant quantity on the third track of the magnetic drum is read and then rewritten on the first track in the same position as the original output of the computer. The first and second tracks are each divided into a plurality of word and bit increments about the length thereof. The increments on each of these tracks pertaining to the same quantity are aligned in side-by-side relation.

The above-described apparatus provides a basis upon which a highly versatile input-output processor can be constructed for translating various and many types of functions between the computer and its real-time environment. The output from the logic circuit means can be passed to the accumulator of the computer, a printer and/or display device, or an error generator and then to a digital-to-analog converter for providing analog electrical signals that control a motor, for example. Digital pulse inputs coming from counters performing a storage function and serializers can be added to the output in the first storage means for transmittal to the accumulator of the computer or circulated to the first track in the manner above described. To this end, an input mixer is disposed between the logic circuit means and both the second storage means defined by the second track of the magnetic drum and the digital pulse inputs.

The input-output processor is also capable of providing accurately timed pulse rates or discrete pulse outputs at predetermined times. The logic circuit means comprises borrow-carry circuitry and the incremental quantity recorded in the second storage track by the computer is selected to provide an overflow after a predetermined number of drum revolutions. This overflow or carry-borrow signal defines a pulse output. One particularly important aspect of the invention is that a series of pulses wherein the interval between any pair or number of pulses within the series can be obtained by changing the incremental quantity in a desired manner. These pulse rates or output pulses can be employed for synchronizing ancillary apparatus associated with the computer, such as radar transmitting and receiving means, for example.

It is the primary or ultimate object of the present invention to provide method and apparatus for processing data characterized by its ability to effectively bridge the gap between a computer and its real-time environment.

Another object of the invention is to provide method and apparatus for processing data wherein the outputs from a computer are periodically and incrementally updated. Apparatus is disclosed for circulating information in order that incremental changes can be added to or subtracted from the outputs of the computer between the computation of successive outputs for the same function. The arrangement is such that the output devices respond to the outputs of the computer in an improved manner.

Another object of the invention is the provision of method and apparatus for processing data wherein accurately timed pulse rates and/or discrete pulses are generated. The carry-borrow signal from the adder-subtractor provides the pulse output and the incremental quantity is selected to provide the carry-borrow signal at the desired time. These pulse rates and discrete pulses have a resolution much higher than the actual time between successive computations for the same function in the computer.

Yet another object of the invention is to provide method and apparatus for processing data which is capable of generating a series of pulse trains wherein the time interval between successive pulses or series of pulses may be varied as desired. The incremental quantity is changed in accordance with a predetermined pattern to provide this result.

A further object of this invention is to provide method and apparatus for processing data wherein a quantity storage means and an incremental or delta storage means are available along with other circuitry for periodically adding or subtracting the quantities stored in the quantity and delta storage means and for writing the resultant quantity back into the quantity storage means. This operation takes place many times between successive computations of the computer for each function controlled by the computer. In the preferred embodiment of the invention, various tracks on a magnetic drum define the storage means and a portion of the means for circulating the information.

A further object of the invention is to provide method and apparatus for processing data wherein means are incorporated to insure that during certain word times the incremental quantity in the delta storage means is always added to the quantity or output in the quantity storage means. This is particularly advantageous in certain situations where both the plus and the minus sense have to be associated with the quantity placed in the delta storage means.

A further object of the invention is to provide an input-output processor of the type above described wherein the preceding delta position on the delta track of a magnetic drum may be used in connection with the next delta increment on this track to provide increased resolution for the delta quantity associated with the output recorded on the quantity track. The apparatus disclosed is serial in nature—operating in a bit-by-bit mode—and each quantity or word position on the quantity and delta tracks is divided into a plurality of bits. The corresponding bits and words in the quantity and delta tracks are positioned in aligned side-by-side relation. To increase the resolution of the delta quantity for a given word time, the delta position on the delta track for the preceding word time is employed. The method and apparatus for accomplishing this will be hereinafter more fully described.

Yet a further object of the invention is to provide method and apparatus for processing data wherein means for circulating information are provided in order that the computer may be fed information at the proper time; the information arriving either in digital or analog form from the real-time environment. The computer is adapted to receive the input information relating to a certain quantity only during a predetermined time interval and the input-output processor feeds this information into the computer at the proper time.

Still a further object of the invention is to provide an input-output processor having the characteristics above described which is extremely versatile, simplified in construction and operation and utilizes a minimum of component circuits. The component circuits are employed on a time shared basis for performing the many and various functions of the apparatus.

The foregoing and other objects, features and advantages of the invention will be apparent from the following more particular description of a preferred embodiment of the invention, as illustrated in the accompanying drawings.

In the drawings:

FIG. 3 is a diagram of one word time as employed in the input-output processor;

FIG. 8 is a perspective view showing the magnetic drum and the various read and write heads employed in the input-output processor;

FIG. 9 illustrates the manner in which

FIG. 10 is a logical diagram of the magnetic storage means and the read and write circuits;

FIG. 11 is a logical diagram of the input mixer, delta length control, add-subtract control and adder-subtractor;

FIG. 12 is a logical diagram of the error generator; and

FIG. 13 is a logical diagram of the computer accumulator.

INTRODUCTION

Figure 1:
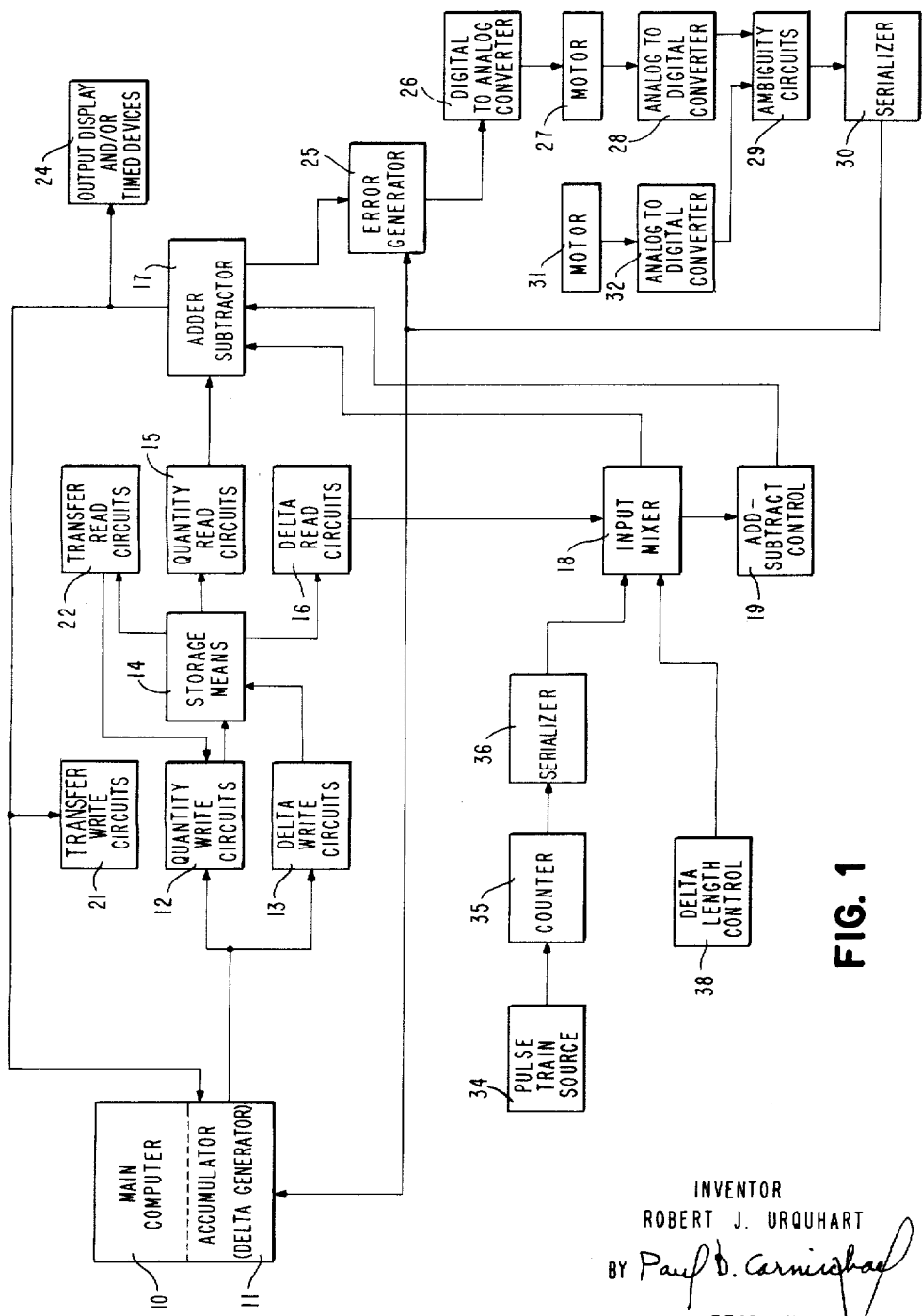
FIG. 1 is a schematic block diagram of apparatus for processing data constructed and employed in accordance with the teachings of the present invention.

Throughout the following description and in the accompanying drawings there are certain conventions employed which are familiar to those skilled in the art. Additional information concerning these conventions are as follows:

Bold-face characters appearing within a block symbol of a logic circuit identified the common name of the circuit represented. The reference indicium And designates a logic block performing the logical And function —no output is present from the block unless and until signals are simultaneously present on each input thereof. The symbol Or designates a logic block performing the logical Or function whereby an output is present when a signal is supplied to any of the various inputs thereof. The And blocks perform Boolean multiplication while the Or blocks perform Boolean addition.

The symbol L refers to a latch while T designates a trigger. Both the latch and trigger blocks are essentially bistable devices which may be employed as storage elements. Each of the triggers T has a pair of output conductors, an input conductor and an inhibit conductor. A logical zero on the input conductor will set the trigger to one of its bistable states, designated as the reset state, while a logical one supplied to the input conductor will cause the trigger to change to its other bistable state, designated as the set state. Thereafter the trigger will follow the signals on the input conductor and will remain in a condition representative of the last signal or bit supplied thereto. Each of the triggers also has an inhibit conductor which must be raised to a positive voltage level each bit time if the trigger is to function in the manner above described. If the inhibit conductor is not raised to a positive voltage level, the trigger will remain in its previous state. In most instances the inhibit conductor is not shown in the detailed logic circuits to avoid complexity and repetition in the drawings. The convention employed is that, if an inhibit conductor is not shown, the inhibit conductor is pulsed each bit time by the timing pulse CP1. The generation of this timing pulse will be hereinafter more fully described.

The latches L each have a pair of output conductors and a pair of input conductors. The latches function much the same as the triggers in that they also perform a storage function. A latch will remain in one of two stable states depending upon which of the two input conductors was last raised to a logical one voltage level.

Invertors, which perform the Boolean inversion, are designated by the symbol I. The driving function is performed by emitter followers EF. Conventional read amplifiers and write amplifiers associated with magnetic reading and writing heads are designated by the symbols RA and WA, respectively.

It will be understood by those skilled in the art that any of a number of various circuit designs can be employed in the block symbols to perform the logical functions above described. In a constructed embodiment of the invention the circuits employed operate on positive pulses with a nominal voltage level of plus fourteen volts defining the logical one and a nominal voltage of zero volts defining the logical zero.

To facilitate the understanding and description of this invention, the general arrangement of the apparatus of a preferred embodiment will first be described with respect both to the manner in which the various circuit components and the apparatus are interconnected and in respect to the general overall operation which is performed by these components and apparatus. The description of the general arrangement will be followed by separate and detailed descriptions of the various components and apparatus, which so require it, and each section of the detailed description will have a heading which indicates the apparatus about to be described.

GENERAL ARRANGEMENT

Referring now to the drawings, and initially to FIG. 1, the present invention will perhaps best be understood by first considering the overall organization and operation thereof. The reference numeral 10 designates a computer which, in accordance with usual practice, has an accumulator 11 in the arithmetic units thereof. The accumulator 11 receives digital numbers or quantities from other portions of the computer.

The accumulator 11 is connected with quantity and delta write circuits 12 and 13, respectively. The accumulator is adapted to supply information in digital form to either the quantity or delta write circuits for recording in a magnetic storage means 14. In the preferred form of the invention the magnetic storage means is a magnetic drum. The information supplied to the delta write circuits from the accumulator is an incremental quantity representing, for example, the expected or desired change in information stored in the magnetic storage means by the accumulator during a predetermined time interval. This time interval can be equated to the time it takes for the magnetic drum to complete one revolution.

Also associated with the quantity and delta storage tracks of the magnetic storage means 14 are the quantity and delta read circuits 15 and 16, respectively. The quantity read circuits 15 are adapted to read out the information placed in the quantity track of the magnetic storage means. The delta read circuits 16 perform the same function with respect to the information on the delta track of the magnetic storage means.

The output of the quantity read circuits 15 is transmitted to an adder-subtractor 17 while the output of the delta read circuits 16 is passed to an input mixer 18. The input mixer 18 performs Boolean addition—the logical Or function—for a plurality of inputs supplied thereto. The other inputs to the input mixer, in addition to the output of the delta read circuits, will be further described in the following portions of the specification.

The output signal of the input mixer 18 is transmitted to the adder-subtractor 17. This latter component, in one mode of operation, either adds or subtracts the incremental quantity supplied from the delta read circuits and the input mixer to or from the information coming from the quantity read circuits. Whether the adder-subtractor 17 will add or subtract the quantities supplied thereto is determined by an add-subtract control 19. This control is responsive, during certain word times, to the sign bit included in the information coming from the input mixer and provides control signals which set the logic circuits in the adder-subtractor either in their add-carry or subtract-borrow states. Suitable gating is provided which, during certain word times, requires that the output signals from the input mixer 18 and the quantity read circuits 15 be added together.

The output signals of the adder-subtractor are employed for a plurality of purposes in the input-output processor of the present invention. This information of data can be introduced directly into the accumulator 11 of the computer 10. Another method of operation involves transmitting the output signals of the adder-subtractor to transfer write circuits 21 which are operative to record the same on a third track of the magnetic storage means 14. After a predetermined time, the information on the transfer track of the magnetic storage means is read by the transfer read circuits 22 and sent to the quantity write circuits 12. The arrangement is such that the output signals of the adder-subtractor can be written on the quantity track of the magnetic storage means in place of the information originally recorded thereon which has previously been supplied to the adder-subtractor 17. The transfer track of the magnetic storage means and its associated write and read circuits 21 and 22, respectively, perform an intermediate storage function which allows the output signals of the adder-subtractor to be placed on the quantity track of the magnetic storage means in the desired position.

The output signals of the adder-subtractor 17 can also be presented directly to ancillary output display and/or recording devices. Further, upon proper selection of the original quantity and delta information placed in the storage means by the accumulator of the computer, the output signals of the adder-subtractor can define accurately timed pulse outputs. The ancillary output display means and the pulse responsive apparatus associated with the input-output processor are represented by the functional block 24 in FIG. 1 of the drawings.

The adder-subtractor is operative to supply output signals to an error generator 25 which comprises, in essence, a subtractor for generating error signals. These error signals correspond to the difference between a desired condition in the real-time environment and the actual condition existing in this environment. In the illustrated embodiment of the invention the error signals from error generator 25 are passed to a digital-to-analog convertor 26 which provides analog output signals for driving a shaft of a motor 27.

The other input to the error generator 25, which corresponds to the actual condition in the real-time environment, is supplied by circuitry including an analog-to-digital convertor 28, ambiguity circuits 29 and a decoder serializer 30. The arrangement is such that the actual position of the shaft of motor 27 is converted to non-ambiguous digital information by the analog-to-digital convertor 28 and the ambiguity circuits 29. The parallel digital information coming from these latter elements is converted to serial form by the decoder serializer 30 and transmitted to the error generator 25.

The output signals of the decoder serializer 30 can also be entered into the accumulator 11 of the computer. The motor 27 is disposed in a closed feedback loop with respect to the error generator 25. However, the above arrangement can be used solely for supplying data concerning the present condition of the real-time environment to the accumulator of the computer. The position of the shaft of a motor 31 is converted to digital information by its associated analog-to-digital convertor 32 and, after passing through the ambiguity circuits 29 and the decoder serializer 30, this digital information is transmitted to the accumulator 11 of the computer.

The error generator 25, the ambiguity circuits 29 and the decoder serializer 30 are adapted to be employed on a time shared basis with a plurality of the motors 27 and 31 and their associated convertors 28 and 32. In this manner a plurality of functions in the real-time environment can be accurately controlled by the computer and/or information pertaining to various happenings in the real-time environment can be introduced into the accumulator.

As mentioned above, the input mixer 18 is adapted to receive a plurality of inputs from various sources—including the output signals of the delta read circuits 16. Another input to the input mixer 18 is supplied from a pulse train source 34 whose pulse outputs are stored in a counter 35 and then translated to serial form by a serializer 36. The digital information coming from the serializer 36 is added to or subtracted from the information stored on the quantity track of the magnetic storage means. The resultant information from the adder-subtractor 17 can then be circulated back to the quantity track of the magnetic storage means or directly to the accumulator of the computer. The counter 35 comprises a series of binary triggers and is stepped in response to the output signals of the pulse train source 34. At the proper time the serializer is interrogated and the digital information is supplied to the input mixer in serial form. In the constructed embodiment of the invention several pulse train sources are utilized on a time shared basis for supplying information to the computer via the input-output processor.

The input mixer also receives signals from delta length control circuits 38. These latter circuits provide increased resolution for the delta quantity associated with a particular word time by allowing the delta space or length in the preceding word time to be used in connection therewith.

Figure 2:
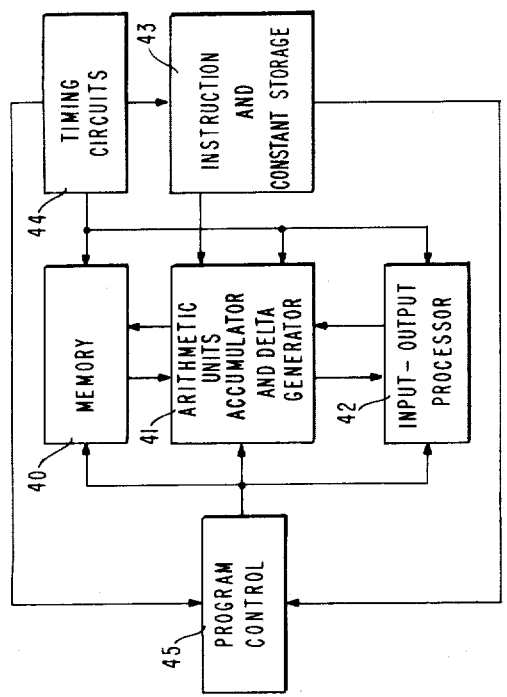
FIG. 2 is a schematic block diagram depicting the major functional units of a computer utilizing the input-output processor.
Figure 9:
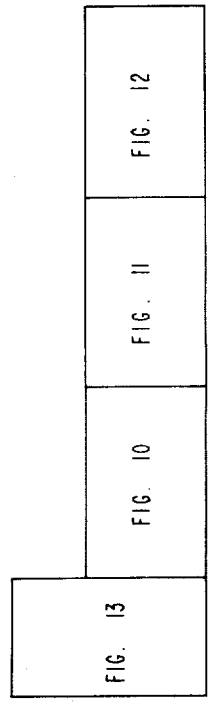

Referring now to FIG. 2 of the drawings, there is shown a schematic block diagram depicting the major functional units of a computer of the type employed in connection with the input-output processor of the present invention. This computer comprises a memory section 40 for the storage of various quantities in digital form. The memory 40 may be of the so-called random access type and constructed from a plurality of magnetic apertured plates as shown and described in U.S. patent application, Serial No. 770,667, filed October 30, 1958, in the name of Albert W. Vinal, entitled "Binary Memory System," now U.S. Patent No. 2,988,732, which is assigned to the assignee of the present invention.

Arithmetic units 41 which comprise various registers and other conventional means for performing computations—including the accumulator 11—are embodied in the computer. The input-output processor 42 is in communication with the accumulator of the arithmetic units 41 as previously explained in connection with FIG. 1 of the drawings.

An instruction and constant storage portion 43 is adapted to retain the various instruction words for the computer program and the mathematical constants used in computation. The computer also comprises timing circuits 44 for the generation of timing pulses which are used throughout the computer—including the input-output processor 42. The remaining functional element of the computer is a program control 45 that, in combination with the timing pulses supplied by the timing circuits 44, determines the functioning of the computer to obtain the desired results.

The memory 40 is in communication with the arithmetic units 41 whereby information may either be taken from the memory for use in the computations performed in the arithmetic units 41 or the computed quantities supplied by the arithmetic units may be returned to the memory 40 for storage. Mathematical constants can also be fed to the arithmetic units 41 from the instruction and constant storage 43. The arithmetic units are in communication with the input-output processor 42.

The particular operation of the computer is controlled by the timing circuits 44 and the program control 45. The instruction and constant storage portion 43 is interconnected with the program control whereby instruction words may be transferred to the program register. It will be noted that the program control 45 and the timing circuits 44 are used in connection with the input-output processor 42.

Each of the quality and delta tracks on the magnetic drum defining the magnetic storage means 14 is divided into a plurality of equal length word segments or word times. In a constructed embodiment of the invention fifty-two words were provided on the delta and quantity tracks. These word positions are positioned in aligned side-by-side relation. Each of the word lengths or word times is further divided into a number of discrete bit positions or bit times. Each bit position is equivalent to a bit of binary information represented by either of two voltage levels.

A diagram of one word length 47 is shown in FIG. 3 of the drawings and it will be noted that the same is divided into thirty-two bit positions 48. The bit positions are identified by the reference indicia B0–B31. For example, when a certain bit of information is said to be present in bit position nine for a given word length, this bit of digital information will be placed in the area designated B9.

As will be hereinafter more fully explained, the accumulator employed in the preferred embodiment of the invention is essentially a register having twenty-two positions. Thus, only twenty-two bit positions of the thirty-two available for each word in the quantity or delta tracks are required for information bits. These twenty-two bits are placed in bit positions B7–B28. The sign bit associated with each string of information bits for the delta track of a magnetic storage means is placed in bit B6 while the parity bit is tacked on at the end of the information quantity in bit position or time B29.

In some instances all twenty-two quantity information bits in a word time will not be required. For example, the analog-to-digital convertor 28 only requires thirteen bits of information which are stored in bit positions twelve through twenty-four, inclusive, in the associated word time. At other times the twenty-two information containing bits will not provide the desired resolution and the delta length control 38 allows two word times to be used for the same quantity.

It should be understood that the present invention is not limited to the use of twenty-two information containing bits for each word time. The input-output processor can be designed for use with a computer using any desired word length. The parity bit generation and checking means will not be shown or described. The use of the parity bit and circuits for performing the above functions are well-known in the art.

Figure 4:
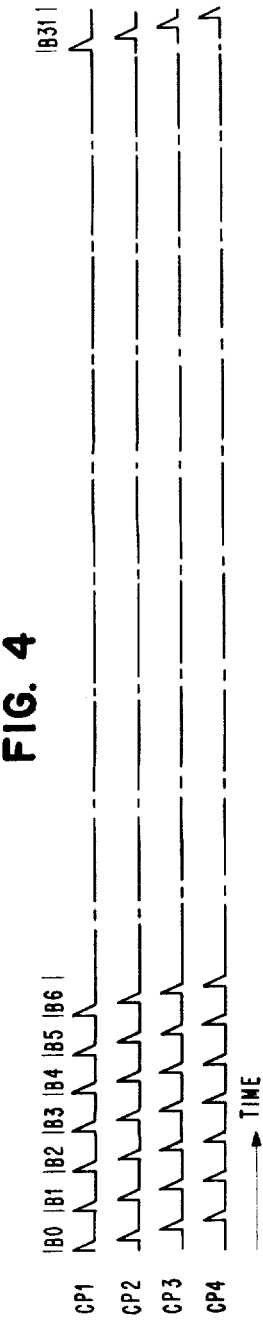
FIGS. 4–6 are timing charts showing the various timing pulses generated by the timing circuits of the computer.
Figure 5:
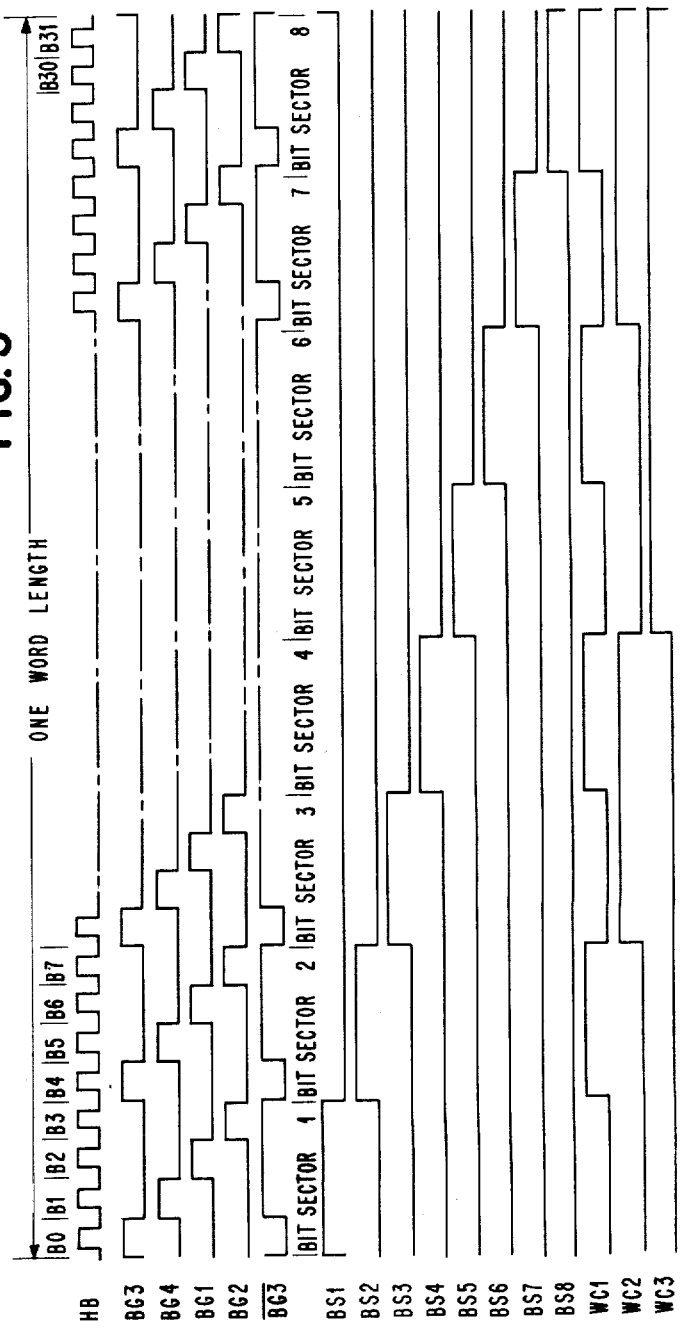
Figure 6:
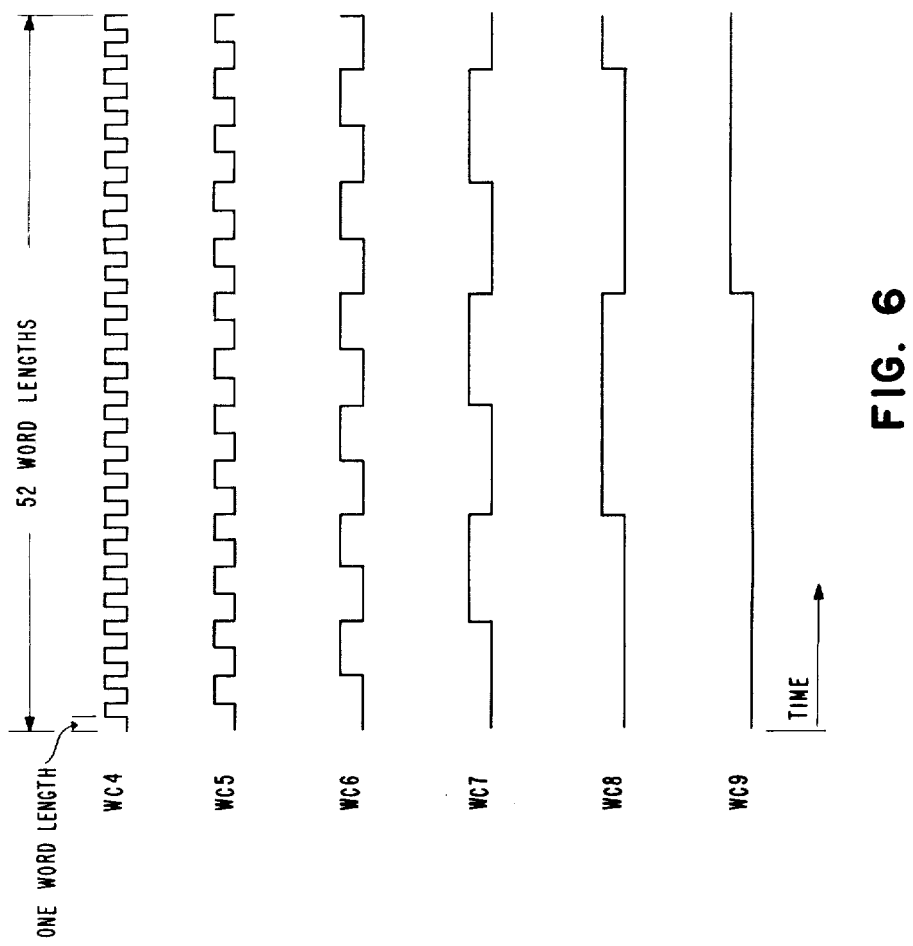
Figure 10:
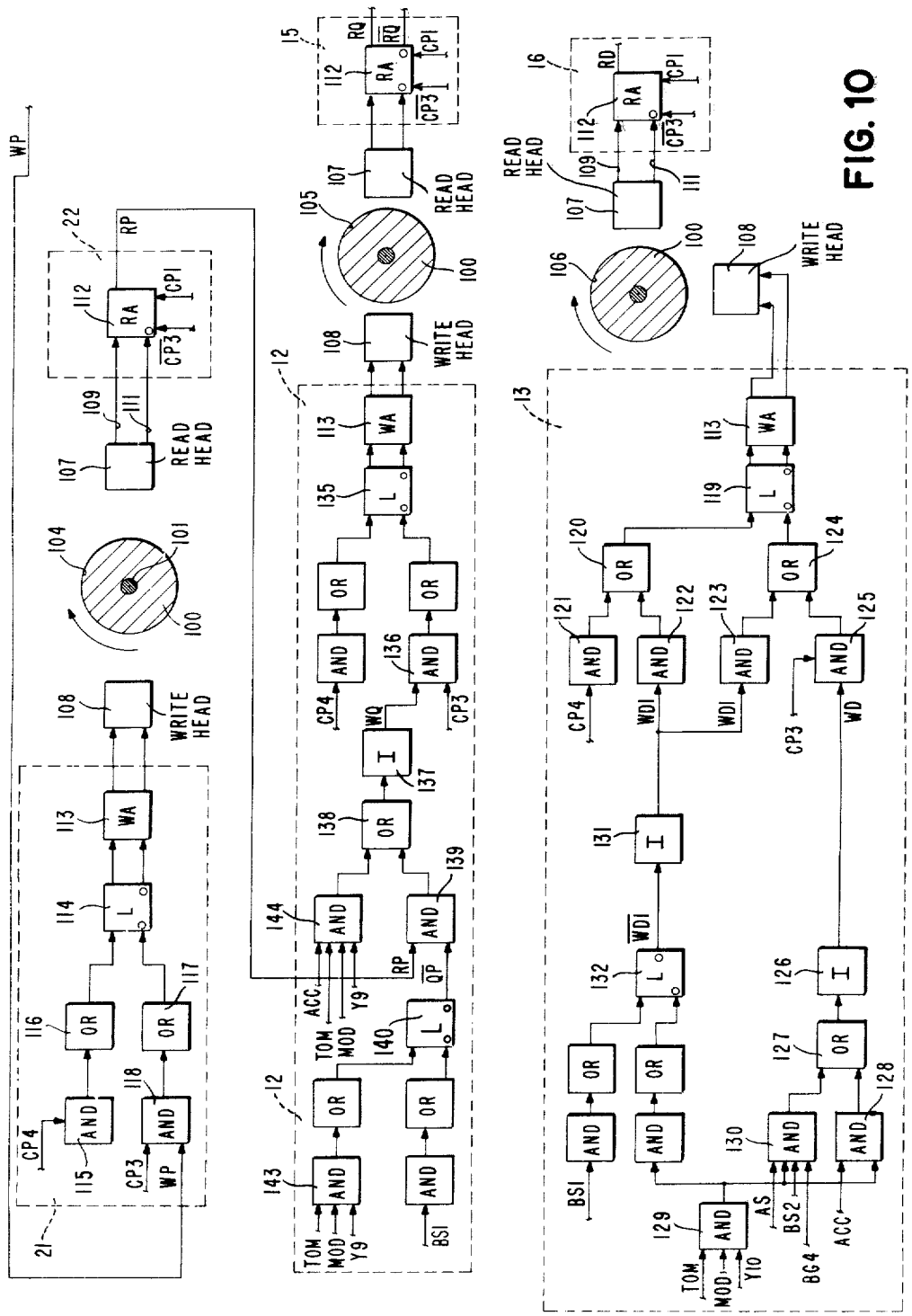
FIGS. 10–13 are mechanically arranged to show in schematic logic block form the apparatus of the present invention.
Figure 11:
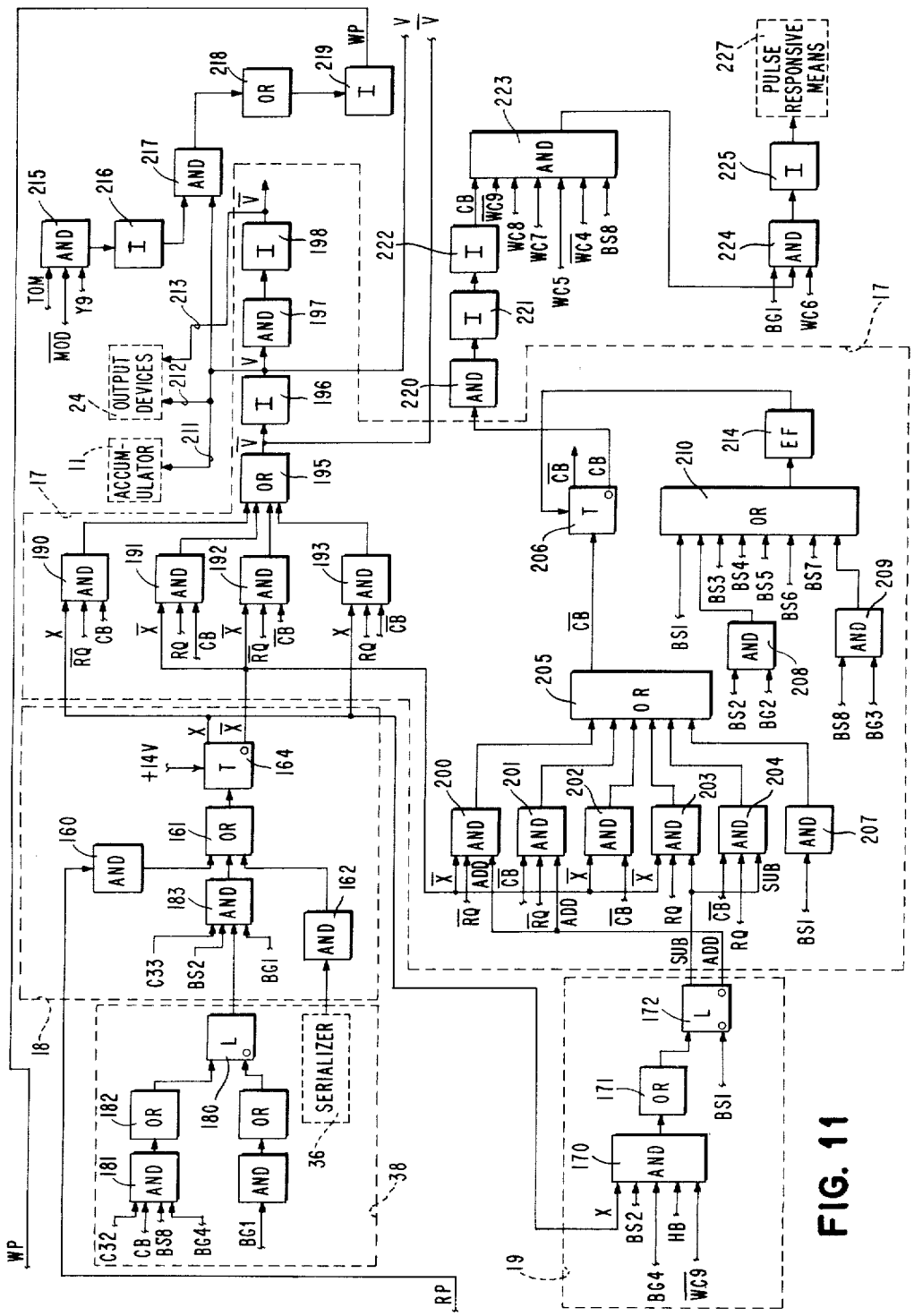
Figure 12:
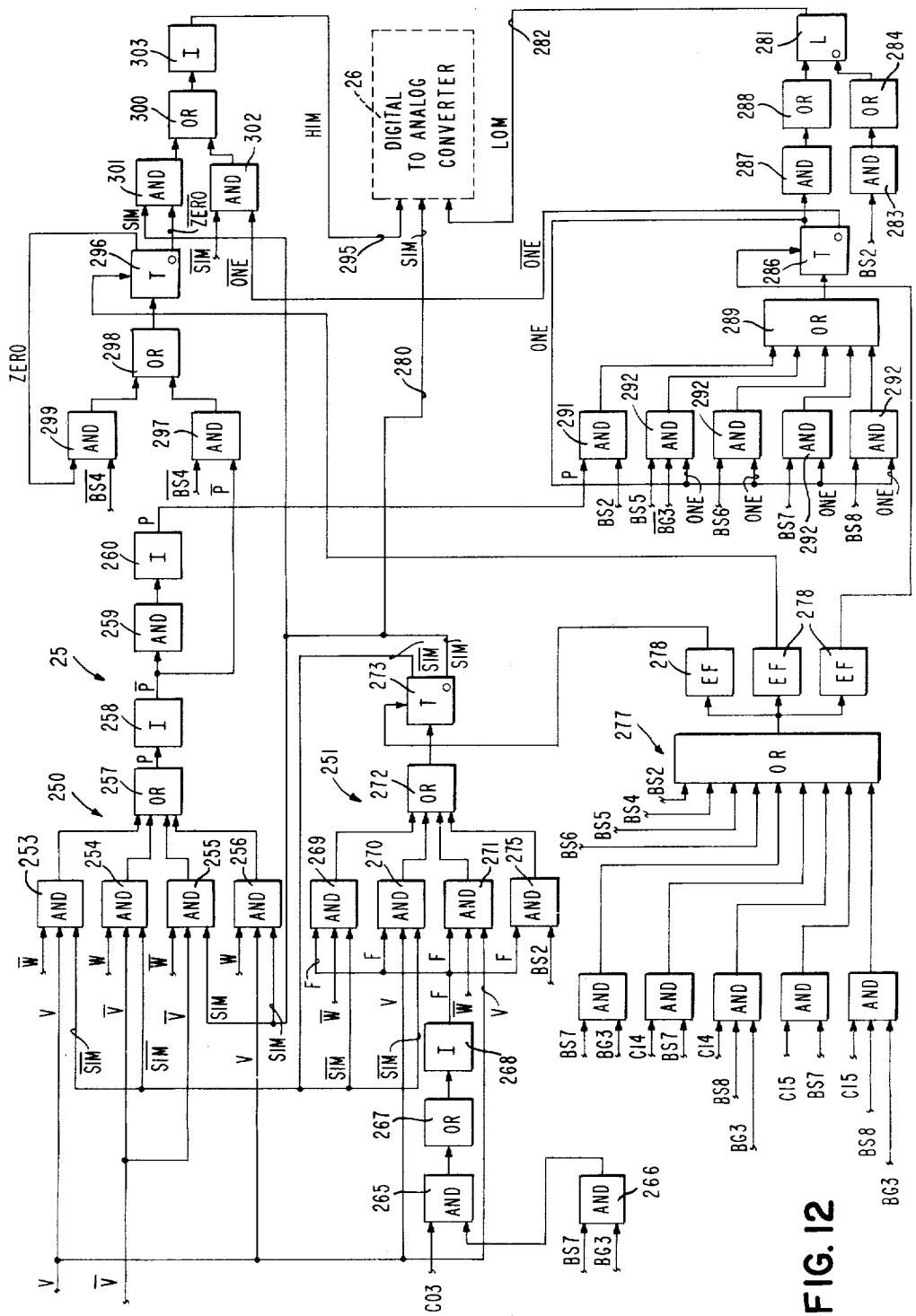

The timing circuits 44 are adapted to supply timing pulses to all portions of the computer—including the input-output processor 42. These various timing pulses are shown in FIGS. 4 through 6 of the drawings. FIG. 4 depicts the occurence of the clock pulses CP1–CP4 with respect to the bit positions B0–B31. In effect, each of the bit positions is directly related to a time interval since the magnetic drum is rotating at a constant speed with respect to the various read and write heads associated with the delta, quantity and transfer tracks. The CP1 signal provides a positive pulse at the beginning of each and every bit time during the operation of the computer. At the end of each timing pulse CP1 a positive timing pulse CP2 occurs and the same relationship is maintained between the timing pulses of CP2–CP3 and CP3–CP4. It will be noted that one of each of the timing pulses CP1–CP4 occurs during each bit time.

Shown in FIG. 5 are the timing pulses BG1–BG4, HB and $\overline{BG3}$. The BG3 signal is positive during the zero bit position and every succeeding fourth bit position. This same relationship also holds true with respect to BG4, BG1 and BG2 with the exception that the first BG4 pulse in any word time occurs during bit time one, the first BG1 pulse is present during bit time two and the initial timing pulse BG2 occurs during bit time three. The signal $\overline{BG3}$ is the inverse of the timing signal BG3. In other words, the BG3 signal is always positive except during the bit times zero, four, eight, twelve, etc. for each word time. When the BG3 signal is at its positive level the $\overline{BG3}$ is at the zero potential level. The inverse of all the timing pulses is available although only the inverted timing signal $\overline{BG3}$ has been shown and described. The half bit or HB timing signal provides a positive pulse each bit time. Each of these positive pulses occurs in the middle portion of a bit time and lasts for one-half of its associated bit time.

In FIG. 5 of the drawings the timing signals BS1–BS8 are graphically illustrated. Each block in the horizontal direction on the graph is indicated as being a bit sector. By definition, each bit sector comprises four bit positions within a word. Thus, there are eight bit sectors for each word with bit sector one including bit positions or times zero through three, bit sector two including bit positions four through seven, etc. The timing signal BS1 is at a positive value during bit sector one or bit times zero through three of each word time. Timing signal BS2 becomes positive at the start of bit time four and lasts through the end of bit time seven. Each of the timing signals BS1–BS8 is positive for one bit sector or four bit positions during each word time.

FIG. 5 of the drawings shows the relationship existing between the timing signals WC1 through WC3 as a function of bit sectors while the timing signals WC4–WC9 are depicted in FIG. 6 with respect to word times. As previously explained, each word time is composed of thirty-two bit times and eight bit sectors. The WC1 timing signal is at its positive level during alternate bit sectors starting with bit sector two. The timing signal WC2 rises to its positive value at the end of bit sector two and remains positive until the end of bit sector four. It will be observed that each of the timing signals WC2–WC9 is at its positive level between consecutive negative going changes in the voltage level of the preceding WC signal. The WC1 signal will rise to its positive level at the end of one bit sector, the WC2 signal at the end of two bit sectors, the WC3 signal at the end of four bit sectors, etc. The WC9 signal will go positive at the end of word time thirty-two and remain positive for the succeeding twenty word times for each drum revolution.

The above-described timing signals or pulses are sufficient to provide a means for interrogating any bit time within any word time as is required. This interrogation may be accomplished by suitable gating using the logic And or Or blocks.

Any apparatus well-known to those skilled in the art may be employed for generating the timing signals outlined above. It is preferred that the generation of the timing signals be synchronized with the rotation of the magnetic drum. A form of a bit gate generator suitable for use in the present embodiment is to be found in U.S. patent application, Serial No. 745,194, in the name of Gene J. Cour, filed June 27, 1958, now U.S. Patent No. 3,017,627, and which is assigned to the assignee of the present invention.

Overall operation

Considering now the overall operation of the above-described apparatus, it should be remembered that the accumulator of the computer is adapted to place data on the quantity and delta tracks of the magnetic storage means. Basically, the input-output processor is a serial device and the accumulator is operative to write an output corresponding to some function or event on the quantity track of the magnetic storage means. A delta quantity representing the expected incremental change in the output written on the quantity track for each revolution of the magnetic drum is determined on the basis of past experience by the computer and written on the delta track during the same revolution of the magnetic drum in which the output information is recorded thereon. Once each revolution the quantity and delta information on the magnetic drum is read out and combined in the adder-subtractor 17. Whether this information is added or subtracted depends upon the sign bits associated with the information and the word time during which the information is supplied to the adder-subtractor as determined by the add-subtract control 19. The resultant quantity issuing from the adder-subtractor is supplied to the transfer write circuits 21 and recorded on the transfer track of the magnetic drum.

The transfer read circuits 22 read the information on the transfer track and supply the same to the quantity write circuits 12. The quantity write circuits record the information representing the new or present value of the function or event on the quantity track at the same position and in place of the original information stored thereon. The transfer track is employed since the time delay though the adder-subtractor is quite small and since it is not physically possible to place the read and write heads for the quantity track as close together as would be required. However, in the broad aspects, the invention is not limited to the use of an intermediate transfer track. For example, if less than half the quantity track is used for word times, the same track might perform the storage and time delay function. Alternately, it may be possible to introduce a sufficient time delay in the information coming from the adder-subtractor to permit the placing of the write head to record the same in the proper position on the quantity track.

By repeating the above operation for the circulation of information, each drum revolution between successive computations of the computer pertaining to the same function or event, the output from the adder-subtractor will at all times be equal to the calculated present condition of the function or event. The output of the adder-subtractor may be returned to the accumulator of the computer if this is desired.

The output of the computer may also be supplied to an error generator functioning as above described and providing control signals for an output device or a motor. The motor will be driven in small incremental steps between successive computations of the quantity information by the computer.

Figure 7:
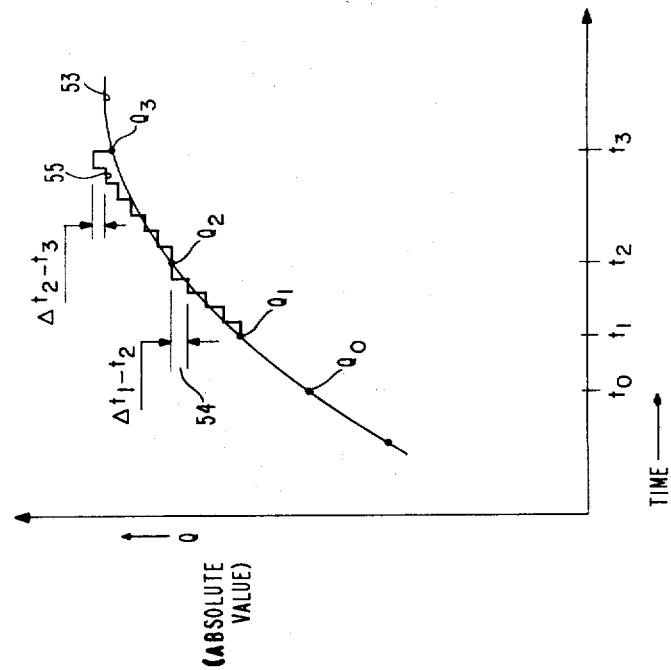
FIG. 7 is a graph of an output of the computer with respect to time showing the use thereof in controlling an output device.

This is illustrated in FIG. 7 of the drawings wherein line 53 designates the desired response of a motor. The computer is operative at the times $t_0$–$t_3$ to compute the quantities $Q_0$–$Q_3$ and place the same on the quantity track. These quantities have absolute values which place the same at spaced points on the line 53. Between the successive computations of the quantities $Q_1$ and $Q_2$ the delta quantity 54 is added each drum revolution to the information stored in the quantity track. The delta quantity is calculated by the computer on the basis of the expected rate of change to take place during each drum revolution from prior computed values of the quantity information. The delta quantity for the period between times $t_1$ and $t_2$ can be expressed by the following equation:

$$(1) \quad \Delta t_1 - t_2 = \left( \frac{Q_1 - Q_0}{t_1 - t_0} \right)$$

Each time the computer provides a new output to the quantity track a delta quantity is also supplied to and recorded on the delta track. Thus, the motor will be driven in accordance with the stepped line 53 that is a close approximation of the actual response 53 desired. The computed incremental rate of change may be slightly in error so that the actual shaft position of the motor at the time of the next computer calculation for this quantity may be slightly inaccurate. However, this discrepancy will be much less than the change in absolute value of the quantity between successive computations thereof.

The input-output processor is also capable of providing accurately timed pulse rates or discrete pulse outputs at predetermined times. The adder-subtractor comprises suitable carry-borrow circuitry; and to generate a pulse rate, zeros are initially written on the quantity track for the selected word time. A quantity is placed on the delta track for this word time which is so scaled that the carry-borrow signal from the adder-subtractor is equivalent to one pulse. As before, the delta quantity is added to the information on the quantity track, and the carry-borrow signal of the adder-subtractor is gated to the proper output as a pulse with the sign of the delta quantity determining polarity, while the remainder is written on the transfer track and then circulated back to the quantity track. In this manner, a very accurate pulse rate will be generated.

To provide a discrete output pulse, the computer determines that a certain number of drum revolutions remain until the pulse is desired. Information corresponding to the following equation is written on the quantity track:

(2) $$Q = 1 - 2^{-y}(X)$$

where:

$X$ = number of drum revolutions remaining until pulse,
$y$ = a constant preferably of sufficient value so that no more than one pulse can be generated between successive computations by the computer.

Also, during the same drum revolution, the accumulator is operative to write information on the delta track which can be expressed as follows:

(3) $$\Delta = 2 - y$$

It can thus be seen that after $X$ drum revolutions a carry-borrow signal will be generated, causing the desired output.

It is also possible to generate series of pulse outputs wherein the spacing between any two pulses on any number of pulses is varied in accordance with a predetermined pattern. This is accomplished under the control of the computer by changing the quantity stored on the delta track for the associated word time to provide the desired results.

Another function of the input-output processor of the present invention is to supply digital pulse trains to the accumulator. The binary counter 35 has a capacity to accumulate the maximum number of pulses that could occur within one revolution of the magnetic drum. Once each drum revolution, the contents of the binary counter 35 are serialized and transferred into the adder-subtractor along with the accumulated value for the particular function from the quantity track. The output of the adder-subtractor is written on the transfer track and then circulated back to the quantity track.

Once each computation cycle of the computer for this quantity, the write circuits for the transfer track are blocked and the output of the adder-subtractor is fed into the accumulator. It will thus be seen that the counter 35 may be much smaller than would normally be required, but yet the up-dated information is supplied to the accumulator at the desired time. This is accomplished by the circulation of information between the quantity track on the magnetic drum and the adder-subtractor. In effect, the input-output processor bridges the gap between the computer and the pulse train source 34.

The output of the adder-subtractor 17 can be transmitted directly to output display devices. Digital information corresponding to the position of the shaft of motor 31 can also be entered into the computer at desired times.

The operation of the input-output processor in accomplishing the above is under control of the various timing pulses generated by the timing circuits 44 and the instructions coming from the program control 45. The introduction of the proper control signals to the input-output processor from the program control 45 will be disclosed in connection with the detailed description of the preferred embodiment of the invention.

DETAILED DESCRIPTION

In this portion of the specification those of the various functional blocks shown in FIG. 1 of the drawings requiring further explanation will be described. To facilitate this description, the magnetic storage means and the read and write circuits will be described first. The description will then proceed in the order in which the various functional blocks are interconnected.

*Magnetic storage means and read and write circuits*

The magnetic storage means 14 comprises a drum 100 having a cylindrical outer surface of magnetic material susceptible for the storage of information thereon. The magnetic drum 100 is rigidly mounted on a shaft 101 and is driven at high speed by any suitable drive means, such as a motor 102 acting through power transmission means 103. In a constructed embodiment of the invention, the magnetic drum 100 is rotated at the rate of one hundred times per second.

The magnetic drum 100 has a great many tracks thereon which may be used in connection with the computer for the storage of constants and instructions. Three of the tracks of the magnetic drum, designated by the reference numerals 104, 105 and 106, are employed in connection with the input-output processor. The track 106 is the delta track while the track 105 is the quantity track. The track 104 performs an intermediate storage function and is known as the transfer track.

Associated with each of the tracks 104–106 is a pair of magnetic to electrical transducing means or heads 107 and 108. The read heads 107 sense the magnetic condition of those portions of the tracks directly thereunder and translate the magnetic information stored on the tracks to proportional electrical signals. The write heads 108 perform the opposite transducing function—changing electrical signals into magnetic information which is recorded on the drum tracks 104–106. These heads may be of the type shown and described in co-pending patent application of Harry Charnetsky, Jr., and William R. Maclay, Serial No. 845,687, filed October 12, 1959, now Patent No. 3,072,752, and entitled "Apparatus for Manifesting Intelligence on Record Media," which is assigned to the assignee of the present invention.

Each of the read heads 107 has two output conductors 109 and 111 leading to a read amplifier 112. The read amplifiers are adapted to amplify the electrical signals coming from the read heads 107 and by the use of internal latches, provide either an output corresponding directly to the binary information on the magnetic drum or the inverse thereof. The timing pulses CP1 and $\overline{CP3}$ are supplied to each of the read amplifiers and insure that a bit of information will be present for six microseconds (.000006 of a second) which is the basic time interval for a bit in a constructed embodiment of the invention.

The inverted outputs of the read amplifiers associated with the transfer track 104 and the delta track 106 are not used in the logical circuitry described in the present specification. The outputs of these read amplifiers are designated by the letters RP and RD, respectively. The outputs from the read amplifier 112 for the quantity track 105 are identified by the symbols RQ and $\overline{RQ}$.

A write amplifier 113 is associated with each of the write heads 103. The write amplifiers are responsive to the output of logic circuit means performing various gating functions and reducing the six microsecond bit times employed in the input-output processor to the three microsecond pulses used in recording and sensing the information on the magnetic drum 100.

In the case of the transfer track 104 this logic circuitry comprises a latch 114 whose input is supplied by timing pulse CP4 from an And block 115 and an Or block 116. The reset conductor of latch 114 receives a signal from Or block 117 and And block 118. The inputs to the And block 118 comprise the timing pulse CP3 and the write signal WP which is generated from the output of the adder-subtractor 17 in a manner to be further explained. In essence, the sum or difference of the signals for any particular word time coming from the quantity track read amplifier and the input mixer may be written on the transfer track 104.

The input circuits to the write amplifier 113 for the delta track 106 terminate in a latch 119 whose input conductor is connected by Or block 120 and And blocks 121 and 122 with timing signal CP4 and signal WD1 which serve to turn on the write amplifier WA for the delta track. The reset conductor of latch 119 is also supplied with the WD1 signal through And block 123 and Or block 124. The reset conductor of this latch is also responsive to the output of And block 125 which is the signal WD containing information from the accumulator of the computer to be written on the delta track 106 as gated by the timing signal CP3.

The WD signal is supplied by suitable gating circuits comprising an invertor 126 and an Or block 127. One input of the Or block 127 is furnished by an And block 128 whose inputs comprises the signal ACC from the accumulator of the computer and the output of And block 129. The other input to Or block 127 comes from And block 130 which receives the signal AS from the computer accumulator and the timing pulses BS2 and BG4. The arrangement is such that the sign bit for each word time is properly gated at the desired bit time.

The And block 130 also receives the output of And block 129 whose input signals are TOM, MOD and Y10. These latter signals are generated by the control portion 45 of the main computer in accordance with the desired programing scheme. The utilization of these signals in controlling the overall operation of the input-output processor will become more fully apparent when examples of typical computer programs are set forth.

The WD1 signal is provided by an invertor 131 whose input is one side of a latch 132. The reset conductor for latch 132 is responsive to the signal coming from And block 129. The input conductor of latch 132 is responsive to timing signal BS1. The arrangement is such that the write amplifier 113 for the delta track is normally de-energized. This amplifier can be turned on at the desired time by the computer control to record the magnitude and the sign bits from the accumulator for the delta quantity during a particular word time on the delta track.

The write amplifier 113 associated with the quantity track 105 is adapted to receive signals either from the read amplifier of the transfer track or from the accumulator of the computer. The inputs to the write amplifier 113 for the quantity track are supplied by a latch 135 whose main input conductor is adapted to be energized by timing pulses CP4. The reset input of latch 135 is taken from an And block 136 whose inputs are the timing pulse CP3 and signal WQ. The WQ signal is the resultant of the signals coming either from the accumulator of the computer or the read amplifier of the transfer track. The WQ signal is supplied to the And block 136 by invertor 137 disposed on the output side of an Or block 138. One input to the Or block 138 is the output of an And block 139 whose respective inputs are the signals RP and $\overline{QP}$. The RP signal is furnished directly from the output of the read amplifier 112 associated with the transfer track. The signal $\overline{QP}$ is provided by a latch 140 and effectively conditions the write amplifier for the recording of information coming from the transfer track. The reset conductor of latch 140 is energized by timing pulse BS1. The main input conductor is energized by the output of an And block 143 whose input signals are TOM, MOD and Y9 from the computer control.

The other input to the Or block 138 comprises the output of And block 144 whose inputs comprise the signals TOM, MOD, Y9 and the output ACC from the magnitude register of the accumulator in the main computer. When the signals TOM, MOD and Y9 are supplied by the computer control, the write amplifier for the quantity track is effectively isolated from the transfer track read amplifier and is connected with the output of the computer accumulator. If any of the above-mentioned three signals supplied by the computer control are not present, then the information on the transfer track will be read and then rewritten in its proper place on the quantity track.

*Input mixer and digital pulse train source*

The input mixer 18 provides a means for mixing or supplying information from a plurality of input sources 34 to the adder-subtractor 17. The signal RD from the read amplifier 112 associated with the delta track 106 is passed through And logic block 160 and then to one input conductor of Or block 161. The other input of the Or block 161 is supplied through And block 162 from the serializer 36 associated with the digital pulse train source 34. The counter has a capacity larger than the highest count expected during any given revolution of the drum. The counter comprises circuitry well-known in the art, such as a plurality of cascaded triggers, adapted to count and store the resultant number. At the proper word and bit times the serializer, comprising a series of And gates, for example, is operative to read the number in the counter in serial form and pass the same to the input mixer. The input to the triggers is synchronized so that the counter will not change state during the readout. At the same time the counter is reset to accumulate the pulse train input until the same is again read out.

The output from the adder-subtractor is circulated to the quantity track of the magnetic drum whereby once each revolution the digital pulse source is interrogated. At the proper time between computation by the computer for this function, the output of the adder-subtractor is passed to the accumulator. During this time the transfer write circuits are blocked. A large number of pulse train sources can be employed with the computer on a time shared basis. For each of these sources one of the word times would be used.

The output of the Or block 161 serves as an input to a trigger 164. The inhibit conductor of the trigger 164 is referenced to the positive terminal of direct current voltage equal in value to the logical one for the system. In this manner the outputs of the trigger will follow exactly the input from the Or block 161. The outputs of the trigger 164 are designated by the symbols X and $\overline{X}$. It will be observed that when there are no inputs to the Or block 161 from the And block 162, the signals X and $\overline{X}$ from the trigger 164 will correspond to the output RD from the read amplifier 112 associated with the delta track 106.

*Delta length control*

During a particular word time the number of bits available on the delta track 106 may not be sufficient for the resolution required in controlling a function in the real-time environment of the computer. This is particularly true when many drum revolutions occur between successive computations by the computer of the function which are written on the quantity track.

In the disclosed embodiment of the invention it is possible to use the delta track associated with the preceding word time to increase the bit positions for the delta quantity in the succeeding word time. This is accomplished by the delta length control circuitry 38 wherein means are provided for storing the overflow bit from the quantity track in the preceding word time and then adding in the input mixer this overflow bit to the outputs of the delta and/or quantity tracks during the succeeding word time in the input mixer.

The above-mentioned storage means comprises a latch 180 whose input conductor is driven by the output of series connected And block 181 and Or block 182. One input to the And block 181 comprises the carry-borrow signal CB generated in the adder-subtractor. The other inputs to the And block 181 comprise timing pulses BS8, BG4 and C32 which define a bit in a selected word time corresponding to the overflow position in this particular word time. In the drawing a C followed by a numeral (C32, for example) defines the output of suitable gating means combining various of the above-described timing signals to provide a positive voltage level during a particular word time represented by the numeral. By overflow position it is meant the bit of the preceding word time when it is desired to transfer the carry-borrow signal into the next word time for use in connection therewith. Thus, if a one is present on the carry-borrow input to the And block 181 in the overflow position, the latch 180 will shift to its other bistable state.

At the first bit time containing information in the succeeding or following word time the condition of the latch 180 will be interrogated by timing signals BS2, BG1 and C33 supplied to the input of And block 183. If the output conductor of the latch 180 is in the up state during the low order bit of the quantity written in the quantity track, the resultant binary one will be introduced to the Or block 161 of the input mixer.

To illustrate the operation of the above, it will be assumed that for word time thirty-three (C33) a delta quantity having many more bit positions than those available during this word time is desired. The delta quantity for the word time thirty-three is written in the proper bit position on the delta track for word time thirty-two by the accumulator of the computer. The bit position in the delta track within word time thirty-two (C32) is selected to provide the desired resolution. During succeeding word times thirty-two, the delta quantity will be added to the information on the quantity track and re-recorded on the quantity track of the drum in the position representing word time thirty-two.

When the overflow position, as above-defined, is reached the delta length control will transfer the overflow into word time thirty-three at the low order bit on the quantity track containing information within this word time. It will thus be seen that the length of the delta quantity for any particular word time can be greatly extended to provide the desired resolution.

In most cases for each word time the delta information will be recorded in the low order bits of the delta quantity and no information will be stored in the higher order bits thereof. To effectively lengthen the delta quantity for each word time, it is possible to offset the delta track with respect to the quantity track by a selected number of bits. This can easily be accomplished by properly positioning the read and write heads of the delta and quantity tracks with respect to each other. It is also possible to incorporate logic circuitry which will allow a delta length to be selected as is desired for any given word time.

*Add-subtract control*

The add-subtract control 19 of the input-output processor comprises an And block 170, an Or block 171 and a latch 172 connected in series relation. One of the leads to the And block 170 is connected with the output conductor of the trigger 164 in the input mixer which defines the X signal. Three of the inputs to this And block are supplied with the timing pulses BS2, BG4 and HB. The effect of these three timing pulses is to define gating means whereby the And block 170 can only pass signals during the sign bit (bit six) of each word time. The remaining input to the And block 170 is $\overline{WC9}$ which is only present during word times zero to thirty-one, inclusive.

The arrangement is such that during word times zero to thirty-one the sign bit of each word will be stored in the latch 172. However, during word times thirty-two to fifty-one the timing signal $\overline{WC9}$ is not present and no output will be supplied by the And block. During these word times the latch 172 will not follow the sign bit for each word but rather will be maintained in its reset condition which requires that the outputs from the input mixer and the quantity tracks be added by the adder-subtractor.

The latch 172 has a pair of outputs which are designated ADD and SUB for convenience of description and explanation. The latch 172 is reset by timing pulse BS1 each word time to the one of its bistable states which energizes the ADD output. Timing pulse BS1 occurs during bit times one through four for each word but no information is contained in the first five bits of each word.

*Adder-subtractor*

The adder-subtractor 17 is supplied with signals X and $\overline{X}$ from the input mixer, RQ and $\overline{RQ}$ from the read amplifier associated with the quantity track 105 on the magnetic drum and the ADD and SUB signals of the latch 172 in the add-subtract control. The adder-subtractor is essentially a full binary adder or subtractor provided with circuit means for generating the carry or borrow functions. Whether the adder-subtractor effectively adds or subtracts the information supplied from the quantity track and the input mixer depends upon the setting of latch 172. If the ADD output signal is provided, the addition and carry operations will be performed. If the SUB output conductor of the latch 172 is at the positive level, the subtraction and borrow operations will be completed.

The operation of the adder-subtractor can be expressed in inverted form by the following Boolean equations.

Sum or Difference:

(4)  $X(\overline{RQ})CB + \overline{X}(RQ)CB + X(RQ)\overline{CB} + \overline{X}(\overline{RQ})\overline{CB}$ Borrow or Carry:

(5)  $\overline{X}(\overline{RQ})ADD + \overline{CB}(\overline{RQ})ADD + \overline{X}(\overline{CB}) +$
$\overline{X}(RQ)SUB + \overline{CB}(RQ)SUB$ where CB and $\overline{CB}$ are the output signals of the carry-borrow circuit means.

For those desiring a more complete understanding of the derivation of these equations, reference may be made to chapter IV of a book entitled "Arithmetic Operations in Digital Computers" by R. K. Richards, which was copyrighted in 1955 and published by D. Van Nostrand Company, Inc., of Princeton, New Jersey.

The above add or subtract function is performed by four And blocks 190–193 whose outputs serve as inputs to an Or block 195. The output of the Or block 195 is the Boolean expression set forth in equation (4) above which is designated by the symbol $\overline{V}$. The $\overline{V}$ signal is passed through an invertor 196 to provide the true sum or subtract signal V. For driving purposes the signal V is fed through the series related And block 197 and an invertor 198. The output of the invertor 198 is again the signal $\overline{V}$.

The inverted carry-borrow signal $\overline{CB}$ is provided in a similar manner by numerous And blocks 200–204 whose outputs serve as inputs to an Or block 205. The inverted carry-borrow signal $\overline{CB}$ coming from the Or block 205 drives a trigger 206 which serves as a storage means.

A reset for trigger 206 is provided by timing pulse BS1 which passes through an And block 207 and the Or block 205 to the trigger. It will be noted that no information is contained in the first four bits in any word time which is the time of occurrence of timing pulse BS1.

To meet the requirement that a signal generated during a certain bit time be the carry for the next bit time in any particular word time, the inhibit conductor of the trigger 206 is properly and periodically energized through suitable gating means. This gating means is accomplished in part by the timing pulses BS1, BS2, BG2, BS3, BS4, BS5, BS6, BS7, BS8 and BG3. The timing pulses BS2–BG2 and BS8–BG3 are passed through And blocks 208 and 209, respectively. The outputs of these And blocks and above-mentioned timing pulses serve as inputs to Or logic block 210 whose output is transmitted to the inhibit conductor of trigger 206 by means of an emitter follower 214.

*Adder-subtractor outputs*

As shown and explained in connection with FIG. 1 of the drawings, the output of the adder-subtractor (V or $\overline{V}$) may be used for a plurality of purposes, depending upon the operation desired during any given word time as determined by the program entered into the overall computer control. For example, the signal V may be transmitted to the accumulator register of the computer over conductor 211. Alternately, or simultaneously, the signals V and/or $\overline{V}$ can be presented over conductor 212 and 213 to ancillary output devices, such as a display, a printer or a recording device. The signal V may also be transmitted to the write head and write circuits associated with the transfer track 104 for recording thereon and later circulation back onto the quantity track at the proper word time position. Further, as will be hereinafter more fully explained, the output of the adder-subtractor can be transferred to an error generator or comparator. The error generator compares the computed value from the adder-subtractor with a value representing the present condition in the real-time environment and provides proper control or error signals.

When the signal V from the adder-subtractor is transmitted to the accumulator of the computer, it is desired that zeros be written on the transfer track. The reason for this is that the computer performs an overall storage function for the quantity and only those pulses representing the change in the quantity from that previously communicated to the computer is required in the input-output processor.

To accomplish the above, circuit gating means is interposed between the write control circuits for the transfer track and the output of the adder-subtractor. This circuit gating means comprise an And block 215 whose inputs are TOM, $\overline{\text{MOD}}$ and Y9 signals from the computer control. The generation of these signals will be hereinafter more fully explained. The output of And block 215 goes through an invertor 216 and serves as one input for And block 217. The other input to And block 217 is the output of the adder-subtractor or the signal V. The output of And block 217 is conducted through the series related Or block 218 and invertor 219 to provide a control signal WP which serves as an input to the write circuits for the transfer track. The output of the adder-subtractor is only supplied to the write circuits associated with the transfer track of the magnetic drum when the control signals TOM, $\overline{\text{MOD}}$ and Y9 are present to enable And blocks 215 and 217.

As previously explained, the carry signal CB from the adder-subtractor is employed for the generation of accurately timed discrete pulse outputs, pulse rates and/or a series of pulses wherein the time interval between any pair or number of pulses within the series can be varied. The basis of this operation is the adding together each word time the information on the quantity track and the incremental value generated in the computer and written on the delta track and circulating the information back through the transfer track onto the quantity track until a carry signal CB is generated. The overflow or carry signal may serve as the pulse output itself or actuate other pulse generating means.

To accomplish the above, the CB signal from the trigger 206 in the adder-subtractor is passed through suitable driver means, such as series related And block 220 and invertors 221 and 222. Since pulse outputs are generated only during one or more word times, it is necessary to provide suitable gating means which will isolate the pulse responsive means 227 forming a portion of the output display and/or timed devices from the signal CB at word times other than those desired. The need for this gating is apparent since a carry-borrow signal may be present during word times when the outputs of the quantity track and the input mixer are added together for a different purpose. The CB signal plus the timing pulses $\overline{\text{WC9}}$, WC8, WC7, WC5, $\overline{\text{WC4}}$ and BS8 serve as inputs to an And block 223. The output of this And block and timing pulses BG1 and WC6 are passed to a further And block 224 whose output, which defines a desired word and bit time, is conducted to an emitter follower 225. The output of emitter follower 225 drives the pulse responsive or generating means.

While the preferred embodiment of the invention is shown to provide a pulse output during only one word time, it should be clearly understood that as many word times as are necessary may be employed for generating pulse outputs. All that is required is proper programing of the computer control and the provision of additional gating means disposed between the CB signal coming from the adder-subtractor and the other pulse responsive means to allow only those CB signals associated with the word times for such means to pass thereto.

If a discrete pulse output at a particular time is desired, the computer writes an incremental quantity on the delta track which, when added to the information on the quantity track a number of times equal to the number of drum revolutions remaining until the particular time, will provide a CB signal and the pulse output. To obtain a pulse rate an incremental quantity is written on the delta track which will give an overflow or carry signal at the desired time intervals. To obtain a varying pulse train the incremental value on the delta track is changed at predetermined times by the computer to provide carry signals which vary with respect to time in the desired manner.

*Error generator*

The error generator 25 is, in effect, a means for comparing signals representing the desired condition in the real-time environment with signals representing the actual condition in the real-time environment to provide error signals which are used for control purposes. In the illustrated embodiment of the invention, the device being driven or controlled by the error signals comprises a motor 27 whose output shaft must be moved from its present position to a position corresponding to the error signals supplied from the adder-subtractor. The present position of the motor shaft is indicated by the signals W and $\overline{W}$ which are supplied to the error generator.

The actual and analog position of the shaft is converted to binary information by an analog-to-digital convertor 28. This convertor may be of the type described on pages 41–45 of chapter VI of the book entitled "Analog-Digital Conversion Techniques" by Alfred K. Susskind, which was published in 1957 by The Technology Press, Massachusetts Institute of Technology, Cambridge, Massachusetts. In general, brushes are placed on the surface of a disc divided into rings. Each ring contains conducting and non-conducting segments. The segments on the rings are so positioned that the outputs from the brushes are binary signals corresponding to the relative positions between the disc and the brushes. To prevent an ambiguous output which might occur when several brushes approach junctions between conducting and non-conducting segments simultaneously, dual brushes are employed for each ring and ambiguity circuits are used. The ambiguity circuits 29 determine which of the brushes for each ring should be read at any particular time as set forth in the section starting on page 45 of chapter VI in the above-mentioned book to Alfred K. Susskind.

The information from the ambiguity circuits is in parallel form and must be translated to serial form since the input-output processor is designed to handle data on a bit-by-bit basis. This translation is performed by the decoder serializer 30 which may comprise a series of And gates, for example. An And gate is provided for each bit and is interrogated at the proper bit time. In this manner the W and $\overline{W}$ signals are supplied to the error generator.

In the following description it will be assumed that the analog-to-digital convertor is a thirteen bit partial convertor—the digital information from the convertor is contained in thirteen bit positions. In the word time for this control function the thirteen bits associated with the analog-to-digital convertor appear in bit positions twelve through twenty-four, inclusive, when presented to the error generator.

The error generator comprises a full binary subtractor having difference circuity 250 and borrow circuitry 251 for subtracting the signal W representing the actual position of the motor shaft from the signal V supplied from the adder-subtractor and representing the computed or desired position of the motor shaft. The output or difference signal P from the difference circuitry 250 can be expressed by the Boolean equation set forth below:

(6) $P = \overline{W}(\overline{SIM})V + \overline{W}(SIM)\overline{V} + W(\overline{SIM})\overline{V} + W(SIM)V$ where: SIM and $\overline{SIM}$ are the output signals of the borrow circuitry 251.

Each term in the above expression is represented by one of the And blocks 253–256 whose various inputs make up the quantities within that term. The outputs of these And blocks serve as inputs to Or block 257. The output of the Or block 257, which is the difference signal P, is passed to inverter 258 to provide the inverted signal $\overline{P}$. To provide a difference signal P capable of driving other logic circuitry, the $\overline{P}$ signal from inverter 258 passes through the series related And block 259 and inverter 260.

The borrow circuitry 251 is operative to provide the inverted borrow signal $\overline{SIM}$ which can be expressed by the following Boolean equation:

(7) $\overline{SIM} = F(\overline{SIM})\overline{W} + F(\overline{SIM})V + \overline{F}(\overline{W})V$ where: F is a selection signal generated at the proper time by the computer control signal CO3 that is combined in And block 265 with the output of And block 266. The output of And block 265 passes through Or block 267 and inverter 268 to the borrow circuitry.

One of the And blocks 269–271 is provided for each of the terms in the above equation with the various inputs supplied thereto as indicated. The outputs of And blocks 269–271 are combined in an Or block 272 whose output drives a trigger 273. The outputs of the trigger provided the borrow signals SIM and $\overline{SIM}$. A reset signal is supplied to the trigger 273 by timing pulse BS2 through an And block 275 and Or block 272. It will be noted that BS2 occurs during bit times four to seven, inclusive, and the lowest order bit of information in the word time occurs at bit twelve.

For proper timing of the borrow circuitry 251, the least significant digit of the decoder must be available at the subtractor during bit time twelve of the word time. In the disclosed embodiment of the invention the trigger 273 is not inhibited during bit times twelve to twenty-four of the proper word time. Gating circuitry 277 develops the signals to remove the inhibit on trigger 273 and triggers used in other circuits as will be hereinafter described. The various timing pulses are And gated and Or gated to provide an up level for emitter followers 278 which drive the inhibit conductor of the various triggers.

The requirements placed on the error generator by the particular digital-to-analog convertor employed for actually controlling the motor is that three output signals be provided. One of these signals is a "sign" signal which will indicate the direction in which the motor is to be driven. The second signal is the "high" signal which indicates that the motor should be driven at its fast speed. The third signal is a "low signal" indicating that the motor should be driven at slow speed until a null is reached. The definitions of these output signals will be explained in the following portions of the specification. It will be noted that there are eight possible combinations of these output signals of which five are used for controlling the motor as tabulated below:

TABLE NO. 1

| Motor Instruction | High | Low | Sign |
|---|---|---|---|
| Fast—Positive Direction | 1 | 1 | 0 |
| Slow—Positive Direction | 0 | 1 | 0 |
| Null | 0 | 0 | 0 |
| Slow—Negative Direction | 0 | 1 | 1 |
| Fast—Negative Direction | 1 | 1 | 1 |

The sign signal indicates the direction of rotation of the motor and the normal operation of the borrow circuitry 251 will provide the correct sign indication for a partial convertor if it is the last borrow. Thus, if the signal V is greater than the signal W, the final borrow will be zero and the motor will be driven in a positive direction. The trigger 273 performs a storage function and the sign signal (SIM) is taken directly from the output of this trigger over conductor 280.

The requirement for the low signal is that it must be at the one or high level as long as the difference signal P is not zero. The difference signal P is a thirteen bit number extending from serial bit twelve through serial bit twenty-four in the word time. If this number is greater than zero, a one must appear in one of these serial bit positions. If the number is less than zero, it appears in the two's complement form and must also contain a one in at least one serial bit position. Therefore, it is only necessary to detect the occurrence of any one in the difference signal as defined by bit positions twelve to twenty-four in the associated word time to provide the low signal.

The circuit means for accomplishing the above comprises a latch 281 whose output conductor 282 has a positive signal LOM thereon when any ones are detected in the difference signal P. The latch 281 is adapted to be reset each word time by timing pulse BS2 acting through And block 283 and Or block 284. The input conductor of this latch is driven by the signal ONE coming from one side of a trigger 286 and through series connected And block 287 and Or block 288.

The trigger 286 is driven by the output signal from an Or block 289 and provides the signals ONE and $\overline{ONE}$. The inhibit is removed from this trigger during bit times twelve through twenty-four by an output of gating circuitry 277.

One input to the Or block 289 comes from And block 291 whose inputs are the difference signal P and the timing pulse $\overline{BS2}$. The other input to Or block 289 comes from And blocks 292 whose various inputs are the timing pulses BS3, $\overline{BS3}$ BS6, BS7 and BS8 and the ONE output signal from the trigger 286. The arrangement is such that starting with the end of the timing pulse BS2 the difference signal P can be supplied to the input conductor of trigger 286. The trigger 286 will provide a positive output signal ONE for any one occurring in the difference signal P during the time interval beginning with the end of timing pulse BS2 and ending with the end of timing pulse BS4. This timing interval extends from bit time eight to bit time fifteen in the associated word time. Thus, during bit times twelve to fifteen the trigger 286 will follow the difference signal and any ones will be passed through to the latch 281 whereby the LOM signal will be raised to the up value.

During bit times seventeen to twenty-four, the And blocks 292 will be supplied with the feedback signal ONE from the trigger 286 if a one is present in the difference signal P during any of these bit times. The effect of this is to continuously place the ONE signal at the input of trigger 286 whereby the ONE signal is driven to and maintained at the up level when any ones occur in the difference signal during bit times sixteen to twenty-four. The result of this circuitry is that the latch 281 will place a positive voltage signal on the conductor 282 if any ones appear in the difference signal P.

The high signal is defined as requiring a positive voltage level on an output conductor 295 whenever there are any binary ones in the high order bit positions sixteen to twenty-four and the sign signal is plus or when there are any zeros in the high order bit positions sixteen to twenty-four and the sign signal is at a positive level to drive the motor in a negative direction. A means for sensing the presence of any one in the high order bits is provided by the above-described trigger 286. A trigger 296 is adapted to detect the presence of any zeros in the high order bits. This is accomplished by feeding the difference signal $\bar{P}$ and the timing pulse $\overline{BS4}$ through an And block 297 to an Or block 298 whose output drives the input of the trigger 296. The ZERO output signal from the trigger 296 is returned in feedback through And block 299 with the timing pulse $\overline{BS4}$. The output of And block 299 serves as the other input to the Or block 298. The inhibit is removed from the trigger 296 during word times twelve to twenty-four by the gating circuit 277. It will thus be seen that the trigger 296 will place and maintain an up level signal on the ZERO conductor whenever a zero is present in the difference signal during bit times sixteen through twenty-four.

The inverted high signal $\overline{HIM}$ is defined by the output of an Or block 300. One input to this Or block is furnished by the output of And block 301 whose respective inputs are the SIM and $\overline{ZERO}$ signals. The $\overline{SIM}$ and $\overline{ONE}$ signals are combined in And block 302 to provide the other input signal for Or block 300. The output of the Or block 300 is passed through an inverter 303 whereby the signal HIM appears on conductor 295.

The conductors 280, 282 and 295 from the error generator lead to the digital-to-analog convertor. The digital-to-analog convertor performs the function of translating the motor instruction signals coming from the error generator and which are in digital form to analog voltages for actually controlling the motor. The digital-to-analog converter 26 is preferably of the type disclosed and claimed in U.S. Patent No. 2,875,432, to George R. Markow, and entitled "Signal Translating Apparatus" and which is assigned to the assignee of the present invention.

As with many other functional blocks of the input-output processor, the error generator 25, the ambiguity circuits 29 and the decoder serializer 30 are adapted to be employed on a time shared basis with a plurality of motors and their associated convertors or other similar devices. One or more word times is provided for each motor and convertor combination. The time sharing is, of course, accomplished under the control of output signals generated by the computer control.

The input-output processor may be employed to transmit binary information representing the present position of a motor shaft, for example, to the accumulator of the computer. The output of the decoder serializer is entered into the accumulator at the proper time as determined by the computer control.

Computer arithmetic units

The arithmetic units 41 of the computer comprise the accumulator 11, a full adder-subtractor 350 and a memory buffer 351. The memory buffer 351 is adapted to receive quantities of information from the memory 40 of the computer and can transfer the same to the accumulator 11. A first quantity can be transmitted from the memory to the memory buffer and then to the accumulator. A second quantity can then be placed in the memory buffer. The quantities in the accumulator and the memory buffer can then be fed into the adder-subtractor simultaneously. The adder-subtractor is adapted to manipulate the quantities supplied thereto in the manner of the adder-subtractor 17 except that the adder-subtractor 350 operates in the parallel mode. The design of the adder-subtractor 350 is within the purview of one skilled in the art. However, for those desiring a more complete description of the requirements for the same, reference should be made to chapter IV of the above-mentioned book by R. K. Richards entitled "Arithmetic Operations in Digital Computers."

The output quantity of the adder-subtractor 350 is placed in the accumulator. The resultant quantity now in the accumulator can be returned to the memory 40 via the memory buffer 351 or can be passed on to the input-output processor 42. It is not necessary that a quantity coming from the memory via the memory buffer be modified in the adder-subtractor before passing to the input-output processor. The accumulator, adder-subtractor and the memory buffer all are adapted to receive and process information in parallel form. In addition, the accumulator translates information coming from or going to the input-output processor to serial form.

Figure 13:
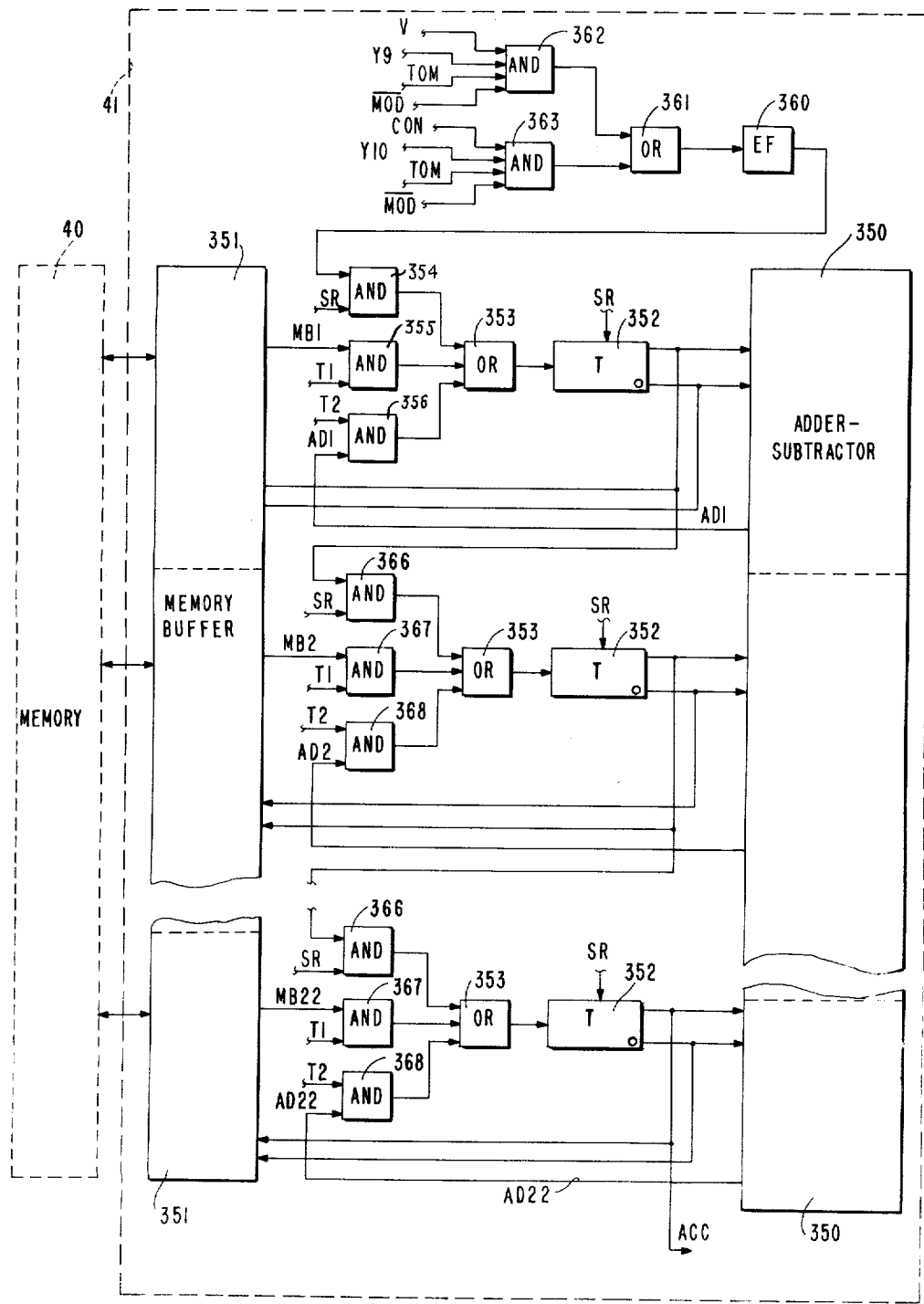

Referring now to FIG. 13 of the drawings, the first two and last stages of the accumulator are shown in logic block diagram form to facilitate understanding of the construction and operation of this apparatus. Since only twenty-two bits of information are employed in the word time of the computer, the accumulator will comprise twenty-two stages.

Each stage of the accumulator includes a trigger 352 whose input is supplied from an Or block 353. The inputs for each of the Or blocks 353 come from a plurality of And blocks to be hereinafter more fully described. The inhibit conductor of each of the triggers 352 is connected with a source of SR timing signals that are applied at proper times under the control of the program control 45 for the computer. The SR timing pulse is at a positive level for twenty-two bit times which equals a computer word length.

In the case of the first stage of the accumulator, the inputs to the Or block 353 are supplied by the outputs of And blocks 354–356. One input to the And block 354 comes from an emitter follower 360 which is driven by the output of Or block 361. The And blocks 362 and 363 combine the signals TOM, $\overline{MOD}$, Y9 and V and TOM, $\overline{MOD}$, Y10 and CON, respectively. The signal V is the output of the adder-subtractor 17 while the CON signal is the serial digital information coming from the decoder serializer 30 associated with the motors 27 and 31 and the analog-to-digital convertors 28 and 32. The other input to the And block 354 comprises the SR signal mentioned above. It will thus be seen that the outputs of the adder-subtractor 17 or the decoder serializer 30 in the input-output processor 42 provide one possible input to the first stage trigger 352 of the accumulator. The application of these signals to the input conductor of this trigger is, of course, under the control of the signals generated by the program control 45 of the computer.

The And block 355 associated with the first stage trigger 352 receives suitable timing signals T1 and signals MB1 coming from the memory buffer 351. The remaining And block 356 is adapted to be energized when timing signal T2 and output signal AD1 from the adder-subtractor are both present. The generation of the timing signals T1 and T2 is controlled by the program control 45 whereby when timing signal T1 occurs, a bit of information in a corresponding position of a quantity in the memory buffer 351 is introduced to the first stage trigger 352. When the timing signal T2 is present, the corresponding bit of the output of the adder-subtractor 350 drives this trigger.

Each of the triggers 352 in the remaining stages of the accumulator has one input of the Or block 353 associated therewith supplied by an And block 366 whose inputs are the signal SR and the output of the trigger 352 in the preceding stage of the accumulator. Another input to the Or block 353 comes from And block 367 which is enabled when the timing signal T1 and a signal MB corresponding to the associated bit position of a quantity in the memory buffer are present. For the second stage of the accumulator the signal from the memory buffer is designated as MB2.

The remaining input to each of the succeeding stages comes from an And block 368 having as one of its input signals the timing pulse T2. The other input signal to this And block comprises the output signal of the adder-subtractor corresponding to the bit position associated with the particular stage of the accumulator. In the case of the second stage of the accumulator this signal is indicated as AD2.

The outputs of each of the triggers 352 lead to the adder-subtractor 350 and are also in communication with the memory buffer 351. The arrangement is such that information in the accumulator—represented by the setting of the triggers 352 may be transmitted either to the adder-subtractor 350 or the memory buffer 351.

The output of the trigger 352 in the last stage of the accumulator is represented by the symbol ACC and is transmitted to either the quantity write circuits 12 or the delta write circuits 13. Whether information from the accumulator is written on the delta or quantity tracks is determined by the program control 45.

The triggers 352 of the accumulator can receive information from either the memory buffer 351, the adder-substractor 350 or the input-output processor 42. These elements can also transfer information into the adder-subtractor, the memory buffer, or the input-output processor. To receive information from either the decoder serializer 30 or the output of the adder-subtractor 17 of the input-output processor 42, the various And gates 354 and 366 are enabled when the timing signal SR goes positive. Since the trigger of each of the stages two through twenty-two is interconnected with the output of the trigger in the succeeding stage, the information coming in serial form from the adder-subtractor or the decoder serializer will ripple down the triggers 352 and be stored therein.

To transfer information to the input-output processor, and particularly the write circuits for the quantity or delta tracks, an output signal is taken from the output conductor of the trigger 352 in the last stage of the accumulator. It will thus be seen that the accumulator translates the parallel information coming either from the adder-subtractor 350 or the memory buffer 351 into serial form as is required for use in the input-output processor. The converse is also true in that the serial information coming either from the decoder serializer 30 or the output of the adder-substractor 17 is translated to parallel form. Of course, the transfer of information between the computer and the input-output processor or vice-versa is under the control of the computer program control 45 and the stored program. The proper combination of the TOM, MOD, $\overline{\text{MOD}}$, Y9 and Y10 signals will control the flow of information between the input-output processor and the computer. The communication provided between the memory, the memory buffer, the accumulator and the adder-subtractor is such that the delta and quantity information can be computed for any particular function or even and then transferred to the quantity and delta tracks of the magnetic drum. For example, to calculate an output for storage on the quantity track, the program may require the transfer of a first number from the memory via the memory buffer to the accumulator. A second number would be entered into the memory buffer. The outputs of the accumulator and the memory buffer would be transmitted to the adder-subtractor for mathematical manipulation as is desired. The output of the adder-subtractor is then returned to the accumulator where it is read out in serial form and passed to the write circuits for the quantity track. A delta quantity can be calculated in the same manner.

*Program control signals and delta generation*

Certain functions of the input-output processor are under the control of signals generated in the program control 45 of the computer. In particular, the program control is responsible for generating instruction signals which will provide for the communication of information back and forth between the accumulator and the input-output processor. For example, during a particular word time it may be desired to write on the delta track.

The control signals employed in the various read and write circuits are TOM, MOD, Y9 and Y10 along with the inverse signals thereof. The following table discloses the sequence of these program control signals which will allow the transfer of the information between the computer and the input-output processor or vice-versa:

TABLE NO. 2

| Function Desired | Control signals required | | |
| --- | --- | --- | --- |
| 1. Computer to write on quantity track | TOM | MOD | Y9 |
| 2. Computer to write on delta track | TOM | MOD | Y10 |
| 3. Computer to read output of adder-subtractor 17. | TOM | $\overline{\text{MOD}}$ | Y9 |
| 4. Computer to read output of decoder serializer 30. | TOM | $\overline{\text{MOD}}$ | Y10 |

It will be noted that if the MOD program control signal is at its positive level, then information is transferred from the accumulator to the input-output processor. However, if the MOD signal is not present ($\overline{\text{MOD}}$) then information is communicated from the input-output processor to the accumulator of the computer. The program control is, of course, operative to generate the above tabulated combinations of signals whereby the desired operations are performed during the proper word times.

To illustrate the operation of the apparatus for processing data, a program for calculating a computer output and the delta quantity associated with this output will be described. It will be assumed that the desired computer output is represented by the equation:

(8) $\qquad R = A \cos \beta + B \sin \beta$

The definition of the terms in the above equation is unnecessary for the present discussion. However, it will be assumed that the quantities representing these terms are available in the memory of the computer at any time.

The first instruction is to clear and add whereby A is transferred from the memory to the accumulator via the memory buffer. The next instruction is to multiply the quantity in the accumulator by the term $\cos \beta$ which requires that the quantity for the latter term be introduced into the adder-subtractor via the memory and the memory buffer along with the quantity in the accumulator. The output of the adder-subtractor is returned to the accumulator.

The following instruction is to return the quantity $A \cos \beta$ in the accumulator to the memory. The quantity $B \sin \beta$ is now calculated. A clear and add instruction places the quantity B in the accumulator. The sin $\beta$ quantity and the B quantity are introduced into the adder-subtractor and multiplied by a multiple instruction. The output of the adder-subtractor is returned to the accumulator and then to the memory for temporary storage.

The next instruction causes the quantities $A \cos \beta$ and $B \sin \beta$, which are in temporary storage in the memory, to be supplied to the adder-subtractor and added together. The output of the adder-subtractor is transferred to the accumulator and then to the memory under the control of a proper instruction and represents the output of the computer which it is desired to record on the quantity track of the magnetic drum in the proper word time. This is accomplished by a write on the quantity track instruction that produces the proper combination of the TOM, MOD and Y9 signals as set forth in Table No. 2 above. Prior to the writing of the information on the quantity track it may be necessary to carry out scaling and/or shifting functions as will be understood by those skilled in the art.

To compute the associated delta quantity a signal is given to clear and add whereby the output which has just been transferred to the quantity track is again placed in the accumulator. Then, when a subtract instruction is given, the preceding output of the computer for this function is transmitted from the memory to the adder-subtractor along with the present output in the accumulator. The difference of these two quantities is then in the accumulator.

The next instruction is to divide the difference in the accumulator by a quantity coming from the memory which is equal to the number of drum revolutions which have taken place between the computation of the output and the preceding output. After this division the quantity in the accumulator is the delta quantity. To transfer the delta quantity to the input-output processor, a write on the delta track instruction is given that provides the proper combination of signals for this purpose as outlined in Table No. 2. Intermediate scaling and/or shifting instructions may be employed if necessary.

It should be apparent that a computer under the control of the above outlined program is adapted to calculate the outputs recorded on the quantity track as well as the delta quantities representing a desired rate of change in the outputs recorded on the delta track. A slightly different program would, of course, be used for those word times where pulse outputs are desired or information from the real-time environment is accumulated and introduced into the computer.

CONCLUSION

It should now be apparent that the objects initially set forth have been accomplished. The input-output processor bridges the gap between a computer and its real-time environment in a manner which greatly enhances the value of the computer when used in such an environment. Of particular importance is the utilization of a quantity calculated by the computer that represents the desired or expected change in an output function or event with respect to a predetermined time interval whereby the same can be controlled in a highly accurate manner. The outputs of the computer can be up-dated between successive computations by the computer, information can be transferred between the computer and the real-time environment or vice-versa in an improved manner and various pulse outputs can be generated.

While the invention has been particularly shown and described with reference to a preferred embodiment thereof, it will be understood by those skilled in the art that the foregoing and other changes in form and details may be made therein without departing from the spirit or scope of the invention.

What is claimed is:

1. In a real-time process control system wherein a digital computer intermittently generates a main control quantity and an incremental quantity representing the desired change in said main control quantity during a time interval, buffer apparatus for converting the main control quantity and the incremental quantity into a sequence of signals at time intervals for controlling an output device comprising a pair of storage means, means for placing a main quantity from said digital computer in one of said storage means, means for placing an incremental quantity from said digital computer in the other of said storage means, means for withdrawing during each time interval the main quantity in said one of said storage means and said incremental quantity from said other of said storage means, means to modify the main quantity from said one of said storage means with said incremental quantity from said other of said storage means during each time interval, means responsive to at least one of said quantities for controlling said means to modify to provide a modified main quantity, control means for selectively overriding said means responsive, means to return the modified main quantity to said one of said storage means, and reading means cooperating with said one of said storage means to provide to an output device during each time interval a control signal corresponding to said modified main quantity.

2. Apparatus according to claim 1 further characterized by said storage means comprising a pair of magnetic tracks, each of said tracks being divided into a plurality of increments, each of the increments on at least one of said tracks containing a sign bit, said means responsive receiving the sign bits and setting said means to modify in response thereto, and said control means comprising means to provide a signal overriding the affect of said means responsive during certain of said increments.

3. In a real-time process control system wherein a digital computer intermittently generates a main control quantity and an incremental quantity representing the desired change in said main control quantity during a time interval, buffer apparatus for converting the main control quantity and the incremental quantity into a sequence of signals at time intervals for controlling an output device comprising a pair of storage means, means for placing a main quantity said digital computer in one of said storage means, means for placing an incremental quantity from said digital computer in the other of said storage means, means for withdrawing during each time interval the main quantity in said one of said storage means and said incremental quantity from said other of said storage means, means to modify the main quantity from said one of said storage means with said incremental quantity from said other of said storage means, means to return the modified main quantity from said means to modify to said one of said storage means, and means for sensing said output of said means to modify for a desired condition to define a pulse control signal for an output device.

4. Apparatus according to claim 3 further characterized in that said means to modify comprises an adder-subtractor, said adder-subtractor having add-subtract and borrow-carry circuits, and the output of said borrow-carry circuit defining a pulse output.

5. In a real-time process control system wherein a digital computer generates a main control quantity and an incremental quantity representing the desired change in said main control quantity during a time interval, buffer apparatus for converting the main control quantity and the incremental quantity into a sequence of signals at time intervals to control an output device comprising a pair of storage means, means for placing a main quantity from said digital computer in one of the storage means, means for placing an incremental quantity from said digital computer in the other of said storage means, means during each time interval the main quantity in said one of said storage means and said incremental quantity from said other of said storage means, means to modify the main quantity from said one of said storage means with said incremental quantity from said other of said storage means, means to return the output of said means to modify to said one of said storage means, a comparator, means to supply said output of said means to modify to said comparator, an output device, means to supply signals representing the present state of said output device to said comparator, said output of said means to modify representing the desired state of said output device, and means to supply the signals from said comparator to said output device for controlling the same.

6. In a real-time process control system wherein a digital computer intermittently generates a main control quantity and an incremental quantity representing the desired change in said main control quantity during a time interval, buffer apparatus for converting the main control quantity and the incremental quantity into a sequence of signals at time intervals for controlling an output device comprising a rotatable magnetic drum having three separate tracks about the periphery thereof, read and write means associated with each of said tracks, a digital computer having an accumulator, means interconnecting said accumulator with the write means for a first of said tracks for transferring a main control quantity from said accumulator to said first track, means interconnecting said accumulator with the write means of a second of said tracks for transferring an incremental quantity from said accumulator to said second track, an adder-subtractor, circuit means connecting the read heads for said first and second tracks with said adder-subtractor to modify the main control quantity recorded on said first track with said incremental quantity each revolution of said magnetic drum, said adder-subtractor having an output conductor, means interconnecting said output conductor with the write head for said third track to record the modified main control quantity on said third track, means interconnecting the read head of said third track with said write head for said first track to record the modified main control quantity on said first track in place of the main control quantity previously recorded thereon, an output device, and gating means interconnecting said output conductor of said adder-subtractor and said output device, said output device being controlled by said modified main control quantity on said output conductor.

7. Apparatus according to claim 6 further characterized by, means to sense the condition of said output device, said means to sense providing feedback data quantities, means to compare said modified control quantities on said output conductor of said adder-subtractor and said feedback data quantities to provide control data quantities, and means to actuate said output device in response to said control data quantities.

8. In a real-time process control system wherein a computer having an output data channel intermittently generates a main control quantity and an incremental quantity representing the desired change in said main control quantity during a time interval, apparatus for converting the main control quantity and the incremental quantity into a sequence of signals at time intervals for controlling an output device comprising a pair of time delay storage means each having read and write means so that a quantity introduced into a time delay storage means by the write means is available at the read means after a time delay, means connecting said output data channel with the write means for said pair of time delay storage means so as to record said main control quantity in one of said time delay storage means and an incremental data quantity in the other of said time delay storage means, data modifying means connected with the read means for said time delay storage means and having output means, said data modifying means modifying the main control quantity in said one of said time delay storage means by said incremental quantity in said other of said time delay storage means once each of said time intervals, means interconnecting the output of said modifying means with said write means for said one of said time delay storage means, an output device, and means connected to the output of said modifying means to supply to said output device once each of said time intervals a control signal corresponding to the modified main control quantity.

9. In a real-time process control system wherein a computer intermittently generates a main control quantity and an incremental quantity representing the desired change in said main control quantity during a time interval, apparatus for converting the main control quantity and the incremental quantity into control signals for controlling an output device comprising a pair of temporary storage devices, means to place said main control quantity in one of said storage devices, means to place said incremental quantity in the other of said storage devices, means to withdraw the main control quantity from said one of said storage devices during each time interval, means to withdraw said incremental quantity from said other of said storage devices during each time interval, means to modify the main control quantity coming from said first mentioned means to withdraw by said incremental quantity coming from said second mentioned means to withdraw to provide control signals during each time interval, and means to return said control signals to said first mentioned means to place for introduction into said one of said storage devices.

10. Apparatus according to claim 9 characterized by said storage devices comprising a pair of magnetic tracks, each of said tracks being divided into a plurality of increments for storing data, and means to vary the length of one of said increments on one of said magnetic tracks with respect to the corresponding increment on the other of said magnetic tracks.

11. Apparatus according to claim 9 further characterized by each of said storage devices being divided into a plurality of data increments, and means to vary the length of the data increments of one of said storage devices with respect to the corresponding data increments of the other of said storage devices.

12. Apparatus according to claim 11 further characterized by said means to modify comprising an adder-subtractor, said adder-subtractor having borrow-carry circuitry, said means to vary comprising means to sense the presence of a borrow-carry signal from said adder-subtractor in the overflow position of one data increment of one of said storage devices, and means to transfer said borrow-carry signal to said adder-subtractor during the next data increment.

13. In a real-time data processing system wherein a computer intermittently generates a main control quantity and an incremental quantity representing the desired change in the main control quantity during a predetermined time interval, apparatus for converting the main control quantity and the incremental quantity into a sequence of signals at predetermined time intervals for controlling an output device, comprising a pair of temporary storage means, means to place the main control quantity from said computer into one of said storage means, means to place the incremental quantity from said computer into the other of said storage means, means to withdraw the main control quantity from said one of said storage means and said incremental quantity from said other of said storage means during each time interval, means to modify the main control quantity from said one of said storage means with said incremental quantity during each time interval, means to return the modified main control quantity from said means to modify to said one of said storage means, and means responsive to said modified main control quantity for producing a control signal during each time interval.

14. In a real-time data processing system wherein a computer intermittently generates a main control quantity and an incremental quantity representing the desired change in the main control quantity during a predetermined time interval, apparatus for converting the main control quantity and the incremental quantity into a sequence of output signals at predetermined time intervals for controlling an output device, comprising a pair of temporary storage devices, means to place a main control quantity from said computer into one of said storage means and the incremental quantity from said computer into the other of said storage means, means to periodically withdraw the main control quantity from said one of said storage means and said incremental quantity from said other of said storage means, means to modify the main control quantity from said one of said storage means with said incremental quantity each time said means to withdraw is actuated, means to return the modified main control quantity from said means to modify to said one of said storage means, and means to sense said modified main control quantity for a selected condition to provide an output signal.

15. Apparatus according to claim 14 characterized by said means to modify comprising an adder-subtractor, and said means to sense comprising borrow-carry circuitry.

16. Apparatus according to claim 14 further characterized by said means to sense providing a pulse output, and said means to place being operative to change the quantities recorded in said pair of storage means to produce a pulse train output.

17. In a real-time data processing system wherein a computer intermittently generates a main data quantity and an incremental data quantity, apparatus for producing a pulse train output wherein the pulses occur at a variable rate comprising a pair of storage means, means to place the main data quantity from said computer into one of said storage means, means to place the incremental data quantity from said computer into the other of said storage means, means to periodically withdraw the main data quantity from said one of said storage means and said incremental data quantity from said other of said storage means, means to modify the main data quantity from said one of storage means with said incremental data quantity each time said means to withdraw is actuated, means to return the modified main data quantity from said means to modify to said one of said storage means, means to sense said modified main data quantity for a selected condition to provide a pulse output.

References Cited by the Examiner

UNITED STATES PATENTS

| 2,916,210 | 12/59 | Selmer | 235—157 |
| 2,995,729 | 8/61 | Steele | 340—172.5 |
| 3,039,688 | 6/62 | Moe et al. | 235—152 |
| 3,109,090 | 10/63 | Cabaniss et al. | 235—152 |

OTHER REFERENCES

Pages 18DC to 26DC, September 1959, A Real Time Variable Increment Digital Computer, Automatic Control, Merz, GEVIC.

MALCOLM A. MORRISON, *Primary Examiner.*

WALTER W. BURNS, JR., *Examiner.*